United States Patent
Hyde et al.

(10) Patent No.: US 8,037,852 B2
(45) Date of Patent: Oct. 18, 2011

(54) FREE PISTON ELECTROMAGNETIC ENGINE

(75) Inventors: Roderick A. Hyde, Redmond, WA (US); William H. Gates, III, Redmond, WA (US); Muriel Y. Ishikawa, Livermore, CA (US); Jordin T. Kare, Seattle, WA (US); Nathan P. Myhrvold, Medina, WA (US); Clarence T. Tegreene, Bellevue, WA (US); Thomas A. Weaver, San Mateo, CA (US); Charles Whitmer, North Bend, WA (US); Lowell L. Wood, Jr., Bellevue, WA (US); Victoria Y. H. Wood, Livermore, CA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 0 days.

(21) Appl. No.: 12/804,426

(22) Filed: Jul. 20, 2010

(65) Prior Publication Data

US 2010/0289263 A1    Nov. 18, 2010

Related U.S. Application Data

(62) Division of application No. 11/973,343, filed on Oct. 5, 2007, now Pat. No. 7,777,357.

(51) Int. Cl.
*F02B 71/00* (2006.01)
(52) U.S. Cl. .......................... 123/46 E; 290/1 A
(58) Field of Classification Search .................. 290/1 R; 123/46 E
See application file for complete search history.

(56) References Cited

U.S. PATENT DOCUMENTS

| | | | |
|---|---|---|---|
| 1,167,366 A | 1/1916 | Fessenden |
| 1,714,364 A | 5/1929 | Hall |
| 1,788,140 A | 1/1931 | Woolson |
| 2,178,310 A | 10/1939 | Pescara |
| 2,334,688 A | 11/1943 | Norton |
| 2,362,151 A | 11/1944 | Ostenberg |
| 2,581,600 A | 1/1952 | Pescara |
| 2,829,276 A | 4/1958 | Jarret et al. |
| 3,105,153 A | 9/1963 | James, Jr. |
| 3,206,609 A | 9/1965 | Dawes |
| 3,766,399 A | 10/1973 | Demetrescu |
| 4,104,995 A | 8/1978 | Steinbock |

(Continued)

FOREIGN PATENT DOCUMENTS

DE    102008042169 A1 *  3/2010

(Continued)

OTHER PUBLICATIONS

U.S. Appl. No. 11/974,173, filed Oct. 10, 2007, Hyde et al.

(Continued)

*Primary Examiner* — Joseph Waks
(74) *Attorney, Agent, or Firm* — Workman Nydegger

(57) ABSTRACT

Methods of operating an internal combustion engine are disclosed that may include a first piston slidably disposed in a first cylinder having a first and a second closed end, and a first converter operable with the first cylinder. The first converter may be configured to convert mechanical energy to electrical energy, and vice versa. As a non-limiting example, such disclosed embodiments may be used to convert mechanical energy of the first piston to electrical energy during a power stroke, and to drive the first piston during one or more of an exhaust stroke, an intake stroke, or a compression stroke.

17 Claims, 11 Drawing Sheets

U.S. PATENT DOCUMENTS

| | | | |
|---|---|---|---|
| 4,112,826 A | 9/1978 | Cataldo | |
| 4,154,200 A | 5/1979 | Jarret et al. | |
| 4,182,288 A | 1/1980 | Thauer | |
| 4,213,428 A | 7/1980 | Bradley | |
| 4,270,495 A | 6/1981 | Freudenstein et al. | |
| 4,392,457 A | 7/1983 | Martin | |
| 4,399,499 A | 8/1983 | Butcher et al. | |
| 4,403,153 A | 9/1983 | Vallon | |
| 4,517,931 A | 5/1985 | Nelson | |
| 4,532,431 A | 7/1985 | Iliev et al. | |
| 4,602,174 A | 7/1986 | Redlich | |
| 4,631,455 A | 12/1986 | Taishoff | |
| 4,876,991 A * | 10/1989 | Galitello, Jr. | 123/46 E |
| 4,996,953 A | 3/1991 | Buck | |
| 5,002,020 A * | 3/1991 | Kos | 123/46 E |
| 5,329,768 A * | 7/1994 | Moscrip | 60/518 |
| 5,829,393 A | 11/1998 | Achten et al. | |
| 6,199,519 B1 | 3/2001 | Van Blarigan | |
| 6,278,204 B1 | 8/2001 | Frenette | |
| 6,506,139 B2 | 1/2003 | Hirt et al. | |
| 6,590,360 B2 | 7/2003 | Hirata et al. | |
| 6,651,599 B2 | 11/2003 | Wechner | |
| 6,748,907 B2 * | 6/2004 | Malmquist et al. | 123/46 E |
| 6,779,495 B2 | 8/2004 | Yamada et al. | |
| 6,932,030 B2 * | 8/2005 | Perlo et al. | 123/46 R |
| 7,019,414 B2 | 3/2006 | Albertson et al. | |
| 7,047,916 B2 * | 5/2006 | Pischinger et al. | 123/46 R |
| 7,082,909 B2 * | 8/2006 | Graf et al. | 123/46 E |
| 7,185,615 B2 | 3/2007 | Sato et al. | |
| 7,188,023 B1 | 3/2007 | O'Daniel et al. | |
| 7,207,299 B2 | 4/2007 | Hofbauer | |
| 7,245,038 B2 | 7/2007 | Albertson et al. | |
| 7,249,584 B2 | 7/2007 | Rozario et al. | |
| 7,255,070 B2 * | 8/2007 | Hofbauer | 123/46 R |
| 7,318,506 B1 * | 1/2008 | Meic et al. | 290/1 A |
| 7,426,910 B2 * | 9/2008 | Elwart | 123/46 E |
| 7,721,686 B2 * | 5/2010 | Lindgarde | 123/46 R |
| 7,845,317 B2 * | 12/2010 | Max et al. | 123/46 E |
| 2005/0081804 A1 | 4/2005 | Graf et al. | |
| 2005/0109295 A1 | 5/2005 | Kaneko et al. | |
| 2006/0124083 A1 * | 6/2006 | Niiyama et al. | 123/46 R |
| 2006/0185631 A1 * | 8/2006 | Fitzgerald | 123/55.5 |
| 2007/0157894 A1 | 7/2007 | Scuderi et al. | |
| 2008/0036312 A1 * | 2/2008 | Max et al. | 310/46 |
| 2008/0271711 A1 * | 11/2008 | Cheeseman | 123/46 E |

FOREIGN PATENT DOCUMENTS

| | | |
|---|---|---|
| GB | 2 219 671 A | 12/1989 |
| JP | 2005-318708 A | 11/2005 |
| WO | WO 01/45977 A2 | 6/2001 |
| WO | WO 01/88353 A1 | 11/2001 |
| WO | WO 2004/025098 A1 | 3/2004 |

OTHER PUBLICATIONS

U.S. Appl. No. 11/973,640, filed Oct. 9, 2007, Hyde et al.
U.S. Appl. No. 11/973,297, filed Oct. 4, 2007, Hyde et al.
U.S. Appl. No. 11/973,343, filed Oct. 5, 2007, Hyde et al.
PCT International Search Report; International App. No. PCT/US08/11482; Jan. 8, 2009; pp. 1-2.
European Patent Office Search Report; Application No. EP 10 17 4618; Jan. 5, 2011; pp. 1-7.
European Patent Office Search Report; Application No. EP 08 83 5918; Jan. 5, 2011; pp. 1-8.

* cited by examiner

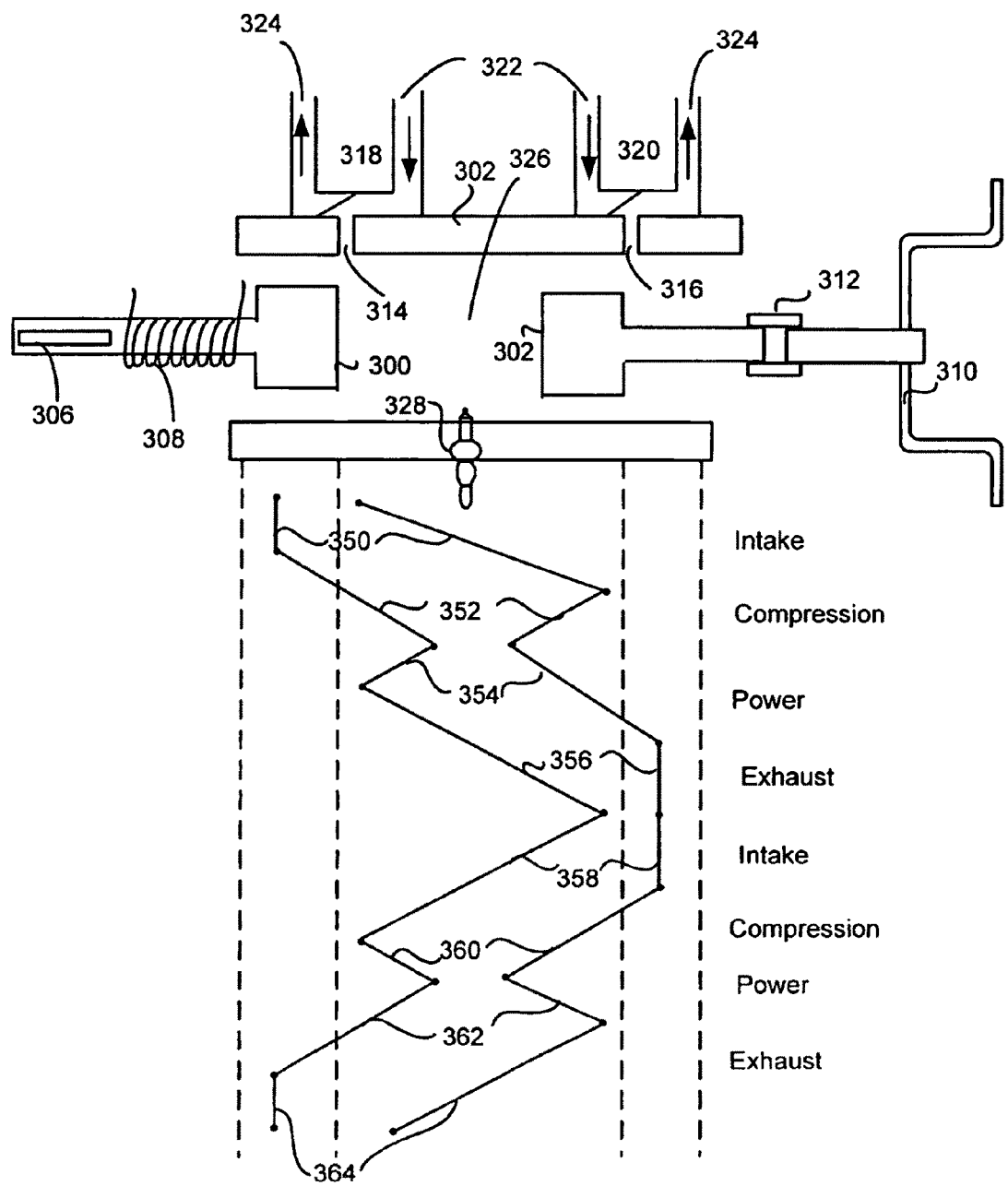

FREE PISTON ELECTROMAGNETIC ENGINE

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications is incorporated herein by reference to the extent such subject matter is not inconsistent herewith.

RELATED APPLICATIONS

For purposes of the USPTO extra-statutory requirements, the present application constitutes a divisional of U.S. patent application Ser. No. 11/973,343, entitled FREE PISTON ELECTROMAGNETIC ENGINE, naming RODERICK A. HYDE, WILLIAM GATES, III, MURIEL Y. ISHIKAWA, JORDIN T. KARE, NATHAN P. MYHRVOLD, CLARENCE T. TEGREENE, THOMAS A. WEAVER, CHARLES WHITMER, LOWELL L. WOOD, JR., AND VICTORIA Y. H. WOOD as inventors, filed 5 Oct. 2007, now U.S. Pat. No. 7,777,357 which is currently, or is an application of which a currently application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/ patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

SUMMARY

In one aspect, an internal combustion engine includes a first piston slidably disposed in a first cylinder with a closed end, a first port configured to admit a reactant to the first cylinder, and a first converter operable with the first piston to convert mechanical energy of the first piston from and to electrical energy within a piston cycle. The first converter may be configured to convert mechanical energy of the first piston to electrical energy during a power stroke, and to drive the first piston during any or all of an exhaust stroke, an intake stroke, and a compression stroke. The first piston may include a magnet (e.g., a permanent magnet or an electromagnet), and the first converter may include an armature configured to generate electric current in response to movement of the magnet or to move the magnet by driving electric current through a coil. The first converter may include a plurality of coils, in which case a first subset of the plurality may be operable to convert electrical energy to mechanical energy of the first piston, and a second subset to convert mechanical energy of the first piston to electrical energy. The engine may further include a thermal controller that acts to limit thermal excursions of all or a portion of the engine (e.g., a cooling system or insulation). The first piston may include an armature configured to interact with a magnetic field through a variable reluctance or variable inductance magnetic circuit.

The engine may further include a reaction trigger (e.g., an electrical igniter such as a spark plug, a thermal igniter, a chemical igniter, a catalyst, a hypergolic injector, particle beam igniter, or a plasma injector) configured to initiate a chemical reaction in a reactant disposed between the first piston and the closed end of the first cylinder. The reaction trigger may be disposed at the closed end of the first cylinder, on the first piston, or elsewhere. The reaction trigger may draw power from the first converter, may be electrically coupled to the first converter, or may draw power from an energy management system coupled to the first converter. The first port may include a valve, which may be configured to open and close via a camshaft, which may in turn be configured to be rotated by an electromagnetic actuator such as a stepper motor, or the valve may be mechanically actuated. The engine may include a second port configured to allow a reaction product to escape from the first cylinder (e.g., on the first cylinder or on the first piston), in which case the first port may include an intake valve and the second port an exhaust valve. The intake and exhaust valves may each be configured to open and close at selected times during the piston cycle (e.g., by mechanical or electronic coupling to the first piston). The intake and exhaust valves may be electronically coupled to the first piston via the first converter. The converter or an energy management system may be configured to supply power to the intake valve and the exhaust valve. The first port may be configured to allow a reaction product to escape from the first cylinder (e.g., on the first cylinder or on the first piston), in which case the engine may include a valve configured to switch the first port from connection with an intake path to connection with an exhaust path.

The engine may further include a carburetor configured to deliver a reactant mixture to the first port. The engine may include an injector (e.g., a fuel injector or a liquid reactant injector) configured to deliver a reactant to the first cylinder via the first port. The first port may be configured to admit fuel, oxidizer, a mixture thereof, or a reactant mixture to the first cylinder, or first and second reactants (e.g., fuel and oxidizer) may be admitted through the first and a second port, respectively. The first piston may be connected to a crankshaft. The engine may further include a second piston slidably disposed in a second cylinder, in which case the first and second pistons may be configured for asynchronous or synchronous reciprocation, or may be coupled to a common or to separate crankshafts. The engine may be configured to run in a first mode in which a chemical reaction drives only the first piston and in a second mode in which a chemical reaction drives the first piston and the second piston, in which case the engine may select between the first and second modes in response to actual or predicted operating conditions. The engine may also be configured to determine a velocity profile or length of a piston stroke or a compression ratio in response to operating conditions. In any of these cases, operating conditions may include incline, temperature, current draw, speed, acceleration, braking, load, fuel composition, engine emissions, power, local rules, or engine settings. The engine may further include an energy management system electrically coupled to the first converter, which may include an energy storage device such as a battery, capacitor, inductor, or mechanical energy storage device. The first cylinder may have a non-circular cross section, in which case the first piston may have a matching non-circular cross section. The first cylinder may be curved (so that the piston travels in a nonlinear path). The first piston may be configured to rotate in the first cylinder (e.g., by the shapes of the first piston and first cylinder, by gas pressure, or by magnetic forces). The first piston may be coupled to a mechanism that converts piston travel to rotary movement (e.g., a helical gear). The mechanism may include a magnet, and the first converter an armature that operates with the magnet to convert rotation of the magnet to electrical energy. The mechanism may include an armature that interacts with a variable reluctance or variable inductance magnetic circuit to convert rotary movement to electrical energy. The mechanism may be configured to rotate at a variable speed in response to a fixed piston speed. The first piston may be operably linked to an active material element (e.g., piezoelectric, magnetostrictive, electrostrictive, or shape memory material) that is configured to respond to applied force to generate electrical energy.

In another aspect, a method of operating an internal combustion engine (including a first piston slidably disposed in a first cylinder and a first converter operable with the first piston to convert mechanical energy of the first piston from and to electrical energy) includes introducing a reactant into a closed end of the first cylinder, applying electrical energy to the first converter to slide the first piston in the first cylinder toward the closed end (optionally compressing the introduced reactant), triggering a chemical reaction of the introduced reactant, thereby transforming chemical potential energy to mechanical energy of the first piston, and converting the mechanical energy of the first piston to electrical energy via the first converter. Introducing reactant into the closed end of the first cylinder may include applying electrical energy to the first converter to slide the first piston in the first cylinder away from the closed end. The method may further include applying electrical energy to the first converter to slide the first piston toward the closed end after triggering the chemical reaction. The first piston may travel a greater distance immediately subsequent to triggering the chemical reaction than during introduction of the reactant into the closed end of the first cylinder. For example, the first piston may travel two or four times an inner cylinder diameter immediately subsequent to triggering the chemical reaction. Compressing the introduced reactant may include compressing the reactant substantially adiabatically or isothermally.

The internal combustion engine may further include a second piston slidably disposed in a second cylinder, in which case the method may further include triggering a chemical reaction in the second cylinder at substantially the same time the chemical reaction is triggered in the first cylinder. The method may include triggering a chemical reaction in the second cylinder at a substantially similar or at a different operating frequency from the first cylinder. The method may also include determining whether to trigger the chemical reaction in the second cylinder at least in part on the basis of an actual or predicted operating condition (e.g., incline, temperature, current draw, speed, acceleration, braking, load, fuel composition, engine emissions, power, local rules, or engine settings). The method may include determining an operating frequency or compression ratio for the first cylinder based at least in part on an actual or predicted operating condition (e.g., incline, temperature, current draw, speed, acceleration, braking, load, fuel composition, engine emissions, power, local rules, or engine settings). Introducing reactant into a closed end of the first cylinder may include introducing the reactant when the first piston is in a selected position, or it may include opening an intake valve (e.g., by rotating a camshaft or electronically triggering opening).

Triggering the chemical reaction may include triggering the chemical reaction when the first cylinder is in a selected position, for example by generating an energy discharge such as a spark, by thermal ignition, by chemical ignition, by exposure to a catalyst, by hypergolic injection, exposure to a particle beam, or by plasma injection, or may include holding the first piston substantially still during the chemical reaction (e.g., by applying a force to the first piston via the converter), in which case the first piston may be released when the chemical reaction is substantially complete. The chemical reaction may produce a reaction product, and converting mechanical energy of the first piston to electrical energy may include substantially adiabatically expanding the reaction product. The introduced reactant may include fuel (e.g., hydrocarbon fuel) or an oxidizer (e.g., oxygen, air), which may be introduced separately or mixed, or it may include a decomposing reactant. The method may further include exhausting a reaction product from the first cylinder.

The first converter may be connected to an energy management system, in which case converting the mechanical energy of the first piston to electrical energy may include transferring electrical energy to the energy management system, or applying electrical energy to the first converter may include drawing electrical energy from the energy management system. The energy management system may include an energy storage device (e.g., a battery, a capacitor, an inductor, or a mechanical energy storage device).

In a further aspect, an internal combustion engine includes a first cylinder having first and second closed ends, a first piston slidably disposed in the first cylinder, first and second ports disposed proximately to the first and second closed ends, respectively, and a first converter operable with the first piston to convert mechanical energy of the first piston from and to electrical energy. The first converter may be configured to convert mechanical energy of the first piston to electrical energy during a power stroke, and to drive the first piston during any or all of an exhaust stroke, an intake stroke, and a compression stroke. The first converter may be configured to drive the first piston during a first and second intake stroke in which the first piston moves away from the first and second closed ends, respectively, of the first cylinder, and first and second quantities of reactants are introduced into the first and second closed ends, respectively, and during a first and second compression stroke in which the first and second reactants are compressed in the first and second closed ends, respectively, and further configured to convert mechanical energy of the first piston to electrical energy during a first and second power/exhaust stroke in which the first piston moves away from the first and second closed ends, respectively, in response to a chemical reaction in the first and second closed ends, respectively, thereby at least partially exhausting a reaction product in the second and first closed ends, respectively. Alternatively, the first converter may be configured to drive the first piston during a first and second intake/compression stroke in which the first piston moves away from the first and second closed ends, respectively, first and second reactants are introduced into the first and second closed ends, respectively, and second and first reactants are compressed in the second and first closed ends, respectively, and during a first and second exhaust stroke in which the first piston moves toward the first and second closed ends, respectively, thereby at least partially exhausting reaction product from the first and second closed ends, respectively, and further configured to convert mechanical energy of the piston to electrical energy during first and second power strokes in which the first piston moves away from the first and second closed ends, respectively, in response to chemical reactions in the first and second closed ends, respectively.

The first piston may include a magnet (e.g., a permanent magnet or an electromagnet), and the first converter may include an armature configured to generate electric current in response to movement of the magnet or to move the magnet by driving electric current through a coil. The first converter may include a plurality of coils, in which case a first subset of the plurality may be operable to convert electrical energy to mechanical energy of the first piston, and a second subset to convert mechanical energy of the first piston to electrical energy. The engine may further include a thermal controller that acts to limit thermal excursions of all or a portion of the engine (e.g., a cooling system or insulation). The first piston may include an armature configured to interact with a magnetic field through a variable reluctance or variable inductance magnetic circuit.

The engine may further include a reaction trigger (e.g., an electrical igniter such as a spark plug, a thermal igniter, a chemical igniter, a catalyst, a hypergolic injector, particle beam igniter, or a plasma injector) configured to initiate a chemical reaction in a reactant disposed between the first piston and the first closed end of the first cylinder. The reaction trigger may be disposed at the first closed end of the first cylinder, on the first piston, or elsewhere. The reaction trigger may draw power from the first converter, may be electrically coupled to the first converter, or may draw power from an energy management system coupled to the first converter. The first port may include a valve, which may be configured to open and close via a camshaft, which may in turn be configured to be rotated by an electromagnetic actuator such as a stepper motor, or the valve may be mechanically actuated. The engine may include a third port proximate to the closed end of the first cylinder and configured to allow a reaction product to escape from the first cylinder (e.g., on the first cylinder or on the first piston), in which case the first port may include an intake valve and the third port an exhaust valve. The intake and exhaust valves may each be configured to open and close at selected times during the piston cycle (e.g., by mechanical or electronic coupling to the first piston). The intake and exhaust valves may be electronically coupled to the first piston via the first converter. The converter or an energy management system may be configured to supply power to the intake valve and the exhaust valve. The first port may be configured to allow a reaction product to escape from the first cylinder (e.g., on the first cylinder or on the first piston), in which case the engine may include a valve configured to switch the first port from connection with an intake path to connection with an exhaust path.

The engine may further include a carburetor configured to deliver a reactant mixture to the first port. The engine may include an injector (e.g., a fuel injector or a liquid reactant injector) configured to deliver a reactant to the first cylinder via the first port. The first port may be configured to admit fuel, oxidizer, a mixture thereof, or a reactant mixture to the first cylinder, or first and second reactants (e.g., fuel and oxidizer) may be admitted through the first and a third port, respectively. The first piston may be connected to a crankshaft. The engine may further include a second piston slidably disposed in a second cylinder, in which case the first and second pistons may be configured for asynchronous or synchronous reciprocation. The second cylinder may include third and fourth fuel intake ports proximate to first and second closed ends of the second cylinder, respectively. The engine may be configured to run in a first mode in which a chemical reaction drives only the first piston and in a second mode in which a chemical reaction drives the first piston and the second piston, in which case the engine may select between the first and second modes in response to actual or predicted operating conditions. The engine may also be configured to determine a velocity profile or length of a piston stroke or a compression ratio in response to operating conditions. In any of these cases, operating conditions may include incline, temperature, current draw, speed, acceleration, braking, load, fuel composition, engine emissions, power, local rules, or engine settings.

The engine may further include an energy management system electrically coupled to the first converter, which may include an energy storage device such as a battery, capacitor, inductor, or mechanical energy storage device. The first cylinder may have a non-circular cross section, in which case the first piston may have a matching non-circular cross section. The first cylinder may be curved (so that the piston travels in a nonlinear path). The first piston may be configured to rotate in the first cylinder (e.g., by the shapes of the first piston and first cylinder, by gas pressure, or by magnetic forces). The first piston may be coupled to a mechanism that converts piston travel to rotary movement (e.g., a helical gear). The mechanism may include a magnet, and the first converter an armature that operates with the magnet to convert rotation of the magnet to electrical energy. The mechanism may include an armature that interacts with a variable reluctance or variable inductance magnetic circuit to convert rotary movement to electrical energy. The mechanism may be configured to rotate at a variable speed in response to a fixed piston speed. The first piston may be operably linked to an active material element (e.g., piezoelectric, magnetostrictive, electrostrictive, or shape memory material) that is configured to respond to applied force to generate electrical energy.

In an additional aspect, a method of operating an internal combustion engine (including a first piston slidably disposed in a first cylinder having a first and a second closed end and a first converter operable with the first piston to convert mechanical energy of the first piston from and to electrical energy) includes introducing a first quantity of reactant into the first closed end of the first cylinder, applying electrical energy to the first converter to slide the first piston in the first cylinder toward the first closed end (optionally compressing the introduced first quantity of reactant), reacting the introduced first quantity of reactant, thereby inducing movement of the first piston toward the second closes end, introducing a second quantity of reactant into the second closed end of the first cylinder, applying electrical energy to the first converter to slide the first piston in the first cylinder toward the second closed end (optionally compressing the introduced second quantity of reactant), reacting the introduced second quantity of reactant, thereby inducing movement of the first piston toward the first closed end, and converting mechanical energy of the first piston to electrical energy via the first converter as the first piston moves toward the first closed end. Inducing movement of the first piston toward the second closed end may include exhausting reaction products from the second closed end, or inducing movement of the first piston toward the first closed end may include exhausting reaction products from the first closed end. The method may further include applying electrical energy to the converter to move the first piston toward the second closed end before compressing the first introduced quantity of reactant, or applying electrical energy to the converter to move the first piston toward the first closed end after converting mechanical energy of the first piston to electrical energy as the first piston moves toward the second closed end and before compressing the introduced second quantity of reactant. The first piston may travel a greater distance during inducing movement of the first piston by reacting a reactant than during compressing the reactant. Compression of the first or second quantities of reactant may be substantially adiabatic or substantially isothermal.

The internal combustion engine may further include a second piston slidably disposed in a second cylinder, in which case the method may further include reacting a third quantity of reactant in the second cylinder at substantially the same time as reacting the first quantity of reactant in the first cylinder. The method may include driving the second cylinder at a substantially similar or at a different operating frequency from the first cylinder. The method may also include determining whether to react a third quantity of reactant in the second cylinder at least in part on the basis of an actual or predicted operating condition (e.g., incline, temperature, current draw, speed, acceleration, braking, load, fuel composition, engine emissions, power, local rules, or engine settings). The method may include determining an operating frequency or compression ratio for the first cylinder based at least in part on an actual or predicted operating condition (e.g., incline, temperature, current draw, speed, acceleration, braking, load, fuel composition, engine emissions, power, local rules, or engine settings). Introducing the first quantity of reactant into a closed end of the first cylinder may include introducing the reactant when the first piston is in a selected position, or it may include opening an intake valve (e.g., by rotating a camshaft or electronically triggering opening).

Reacting the first quantity of reactant may include reacting the first quantity of reactant when the first cylinder is in a selected position, for example by generating an energy discharge such as a spark, by thermal ignition, by chemical ignition, by exposure to a catalyst, by hypergolic injection, exposure to a particle beam, or by plasma injection, or may include holding the first piston substantially still during the chemical reaction (e.g., by applying a force to the first piston via the converter), in which case the first piston may be released when the chemical reaction is substantially complete. The first or second chemical reaction may produce a first or second reaction product, and converting mechanical energy of the first piston to electrical energy may include substantially adiabatically expanding the first or second reaction product. The introduced first quantity of reactant may include fuel (e.g., hydrocarbon fuel) or an oxidizer (e.g., oxygen, air), which may be introduced separately or mixed, or it may include a decomposing reactant. The first and second quantities of reactant may have substantially the same or differing compositions. The method may further include exhausting a reaction product from the first cylinder.

The first converter may be connected to an energy management system, in which case converting the mechanical energy of the first piston to electrical energy as the first piston moves toward the first or the second closed end may include transferring electrical energy to the energy management system, or applying electrical energy to the first converter to slide the first piston in the first cylinder toward the first or the second closed end may include drawing electrical energy from the energy management system. The energy management system may include an energy storage device (e.g., a battery, a capacitor, an inductor, or a mechanical energy storage device).

In yet another aspect, an internal combustion engine includes a first cylinder having a first piston and a second piston slidably disposed therein, a first port arranged to admit a reactant into the first cylinder between the first and second pistons, and a first converter operable with the first piston to convert mechanical energy of the first piston to electrical energy. The first converter may be operable with the first piston to convert electrical energy to mechanical energy of the first piston, and may further be operable with the first piston to convert mechanical energy of the first piston from and to electrical energy within a piston cycle. The engine may further include a second converter operable with the second piston to convert mechanical energy of the second piston to electrical energy, for example converting to and from electrical energy within a piston cycle, or the first converter may be operable with the second piston to convert mechanical energy of the second piston to electrical energy, for example converting to and from electrical energy within a piston cycle. The first port may be configured to exhaust a reaction product from the cylinder, and may be configured to be closed by occlusion by the first piston. The engine may further include a second port configured to exhaust a reaction product from the cylinder, which may be configured to be closed by occlusion by the second piston. The first and second ports may be valveless, or one or both may include a valve.

The first converter may be configured to convert mechanical energy of the first piston to electrical energy during a power stroke, and to drive the first piston during any or all of an exhaust stroke, an intake stroke, and a compression stroke, and may further be configured to control the position of the piston during a reset stroke. The first piston may include a magnet (e.g., a permanent magnet or an electromagnet), and the first converter may include an armature configured to generate electric current in response to movement of the magnet or to move the magnet by driving electric current through a coil. The first converter may include a plurality of coils, in which case a first subset of the plurality may be operable to convert electrical energy to mechanical energy of the first piston, and a second subset to convert mechanical energy of the first piston to electrical energy. The engine may further include a thermal controller that acts to limit thermal excursions of all or a portion of the engine (e.g., a cooling system or insulation). The first piston may include an armature configured to interact with a magnetic field through a variable reluctance or variable inductance magnetic circuit.

The engine may further include a reaction trigger (e.g., an electrical igniter such as a spark plug, a thermal igniter, a chemical igniter, a catalyst, a hypergolic injector, particle beam igniter, or a plasma injector) configured to initiate a chemical reaction in a reactant disposed between the first and second pistons. The reaction trigger may be disposed on a wall of the first cylinder, on the first piston, or elsewhere. The reaction trigger may draw power from the first converter, may be electrically coupled to the first converter, or may draw power from an energy management system coupled to the first converter. The first port may include a valve, which may be configured to open and close via a camshaft, which may in turn be configured to be rotated by an electromagnetic actuator such as a stepper motor, or the valve may be mechanically actuated.

The engine may further include a carburetor configured to deliver a reactant mixture to the first port. The engine may include an injector (e.g., a fuel injector or a liquid reactant injector) configured to deliver a reactant to the first cylinder via the first port. The first port may be configured to admit fuel, oxidizer, a mixture thereof, or a reactant mixture to the first cylinder, or first and second reactants (e.g., fuel and oxidizer) may be admitted through the first and a second port, respectively. The first piston may be connected to a crankshaft. The first and second pistons may not be mechanically coupled. The engine may further include a third piston slidably disposed in a second cylinder, in which case the first and third pistons may be configured for asynchronous or synchronous reciprocation, or may be coupled to a common or to separate crankshafts. The engine may be configured to run in a first mode in which a chemical reaction drives only the first and second pistons and in a second mode in which a chemical reaction drives the first, second, and third pistons, in which case the engine may select between the first and second modes in response to actual or predicted operating conditions. The engine may also be configured to determine a velocity profile or length of a piston stroke or a compression ratio in response to operating conditions. In any of these cases, operating conditions may include incline, temperature, current draw, speed, acceleration, braking, load, fuel composition, engine emissions, power, local rules, or engine settings.

The engine may further include an energy management system electrically coupled to the first converter, which may include an energy storage device such as a battery, capacitor, inductor, or mechanical energy storage device. The first cylinder may have a non-circular cross section, in which case the first and second pistons may each have a matching non-circular cross section. The first cylinder may be curved (so that the pistons travel in a nonlinear path). The first or second pistons may be configured to rotate in the first cylinder (e.g., by the shapes of the first and second pistons and first cylinder, by gas pressure, or by magnetic forces). The first piston may be coupled to a mechanism that converts piston travel to rotary movement (e.g., a helical gear). The mechanism may include a magnet, and the first converter an armature that operates with the magnet to convert rotation of the magnet to electrical energy. The mechanism may include an armature that interacts with a variable reluctance or variable inductance magnetic circuit to convert rotary movement to electrical energy. The mechanism may be configured to rotate at a variable speed in response to a fixed piston speed. The first piston may be operably linked to an active material element (e.g., piezoelectric, magnetostrictive, electrostrictive, or shape memory material) that is configured to respond to applied force to generate electrical energy.

In yet a further aspect, a method of operating an internal combustion engine (including a first and a second piston slidably disposed in a first cylinder and a first converter operable with the first piston to convert mechanical energy of the first piston to and from electrical energy) includes introducing a reactant into the first cylinder between the first and second pistons, applying electrical energy to the first converter to slide the first piston in the first cylinder toward the second piston (optionally compressing the introduced reactant), reacting the reactant, thereby transforming chemical potential energy to mechanical energy of the first and second pistons, and converting the mechanical energy of the first piston to electrical energy via the first converter. The method may further include converting the mechanical energy of the second piston to electrical energy via the first converter or a second converter. The second piston may be connected to a crankshaft. The method may further include exhausting a reaction product from the first cylinder, for example by relatively moving the first and second pistons toward one another. Introducing the reactant into the first cylinder includes relatively moving the first and second pistons away from one another. Compressing the introduced reactant may include compressing the reactant substantially adiabatically or substantially isothermally.

The engine may further include a third piston slidably disposed in a second cylinder, in which case the method may include triggering a chemical reaction in the second cylinder at substantially the same time as the first cylinder, triggering a chemical reaction in the second cylinder at a substantially similar or different operating frequency from an operating frequency of the first cylinder, or determining whether to trigger a chemical reaction in the second cylinder on the basis of a determined actual or predicted operating condition (e.g., incline, temperature, current draw, speed, acceleration, braking, load, fuel composition, engine emissions, power, local rules, or engine settings). The method may include determining an operating frequency or compression ratio for the first cylinder based at least in part on an actual or predicted operating condition (e.g., incline, temperature, current draw, speed, acceleration, braking, load, fuel composition, engine emissions, power, local rules, or engine settings). Introducing reactant into the first cylinder may include introducing the reactant when the first piston is in a selected position, or it may include opening an intake valve (e.g., by rotating a camshaft or electronically triggering opening).

Triggering the chemical reaction may include triggering the chemical reaction when the first cylinder is in a selected position, for example by generating an energy discharge such as a spark, by thermal ignition, by chemical ignition, by exposure to a catalyst, by hypergolic injection, exposure to a particle beam, or by plasma injection, or may include holding the first and second pistons substantially still during the chemical reaction (e.g., by applying a force to the pistons via the converter(s)), in which case the pistons may be released when the chemical reaction is substantially complete. The chemical reaction may produce a reaction product, and converting mechanical energy of the first piston to electrical energy may include substantially adiabatically expanding the reaction product. The introduced reactant may include fuel (e.g., hydrocarbon fuel) or an oxidizer (e.g., oxygen, air), which may be introduced separately or mixed, or it may include a decomposing reactant. The method may further include exhausting a reaction product from the first cylinder.

The first converter may be connected to an energy management system, in which case converting the mechanical energy of the first piston to electrical energy may include transferring electrical energy to the energy management system, or applying electrical energy to the first converter may include drawing electrical energy from the energy management system. The energy management system may include an energy storage device (e.g., a battery, a capacitor, an inductor, or a mechanical energy storage device).

In yet an additional aspect, a method of retrofitting for electrical power generation an internal combustion engine (including a plurality of pistons connected to a common crankshaft) includes applying to at least one and optionally to each piston a power converter operable to convert mechanical energy of the piston to and from electrical energy. The method may further include disconnecting the pistons from the crankshaft. The method may include applying a magnet (e.g., an electromagnet or a permanent magnet) to each piston, wherein the power converter includes an armature operable with the magnet to apply force to the piston. The armature may be operable with the magnet to generate electric current in response to movement of the magnet. The method may further include applying a thermal controller that acts to limit thermal excursions of all or a portion of the engine (e.g., a cooling system or insulation). The power converter may be electrically coupled an energy management system, which may include an energy storage device such as a battery, capacitor, inductor, or mechanical energy storage device. The engine may include an electrically powered reaction trigger, in which case the method may include electrically coupling the energy management system to the electrically powered reaction trigger.

The power converter may be electrically coupled to a control system, which may be configured to drive the pistons synchronously (including in a configuration in which the crankshaft is removed and substantially the same relative phase relationship of the pistons is maintained by the control system) or asynchronously. The control system may be configured to determine whether to drive a selected piston, a velocity profile of a piston stroke, or a compression ratio at least partially in response to a determined operating condition (e.g., incline, temperature, current draw, speed, acceleration, braking, load, fuel composition, engine emissions, power, local rules, or engine settings). Applying the power converter may include coupling the piston to a mechanism that converts piston travel to a rotary movement (e.g., a helical gear). The mechanism may include a magnet, and the first converter an armature that operates with the magnet to convert rotation of the magnet to electrical energy. The mechanism may include an armature that interacts with a variable reluctance or variable inductance magnetic circuit to convert rotary movement to electrical energy. The mechanism may be configured to rotate at a variable speed in response to a fixed piston speed. The power converter may be configured to drive the piston during an intake stroke, an exhaust stroke, and a compression stroke, and to convert mechanical energy of the piston to electrical energy during a power stroke.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 11 illustrates the positions of two opposing pistons in a common cylinder in an eight-stroke piston cycle.

DETAILED DESCRIPTION

Figure 1:
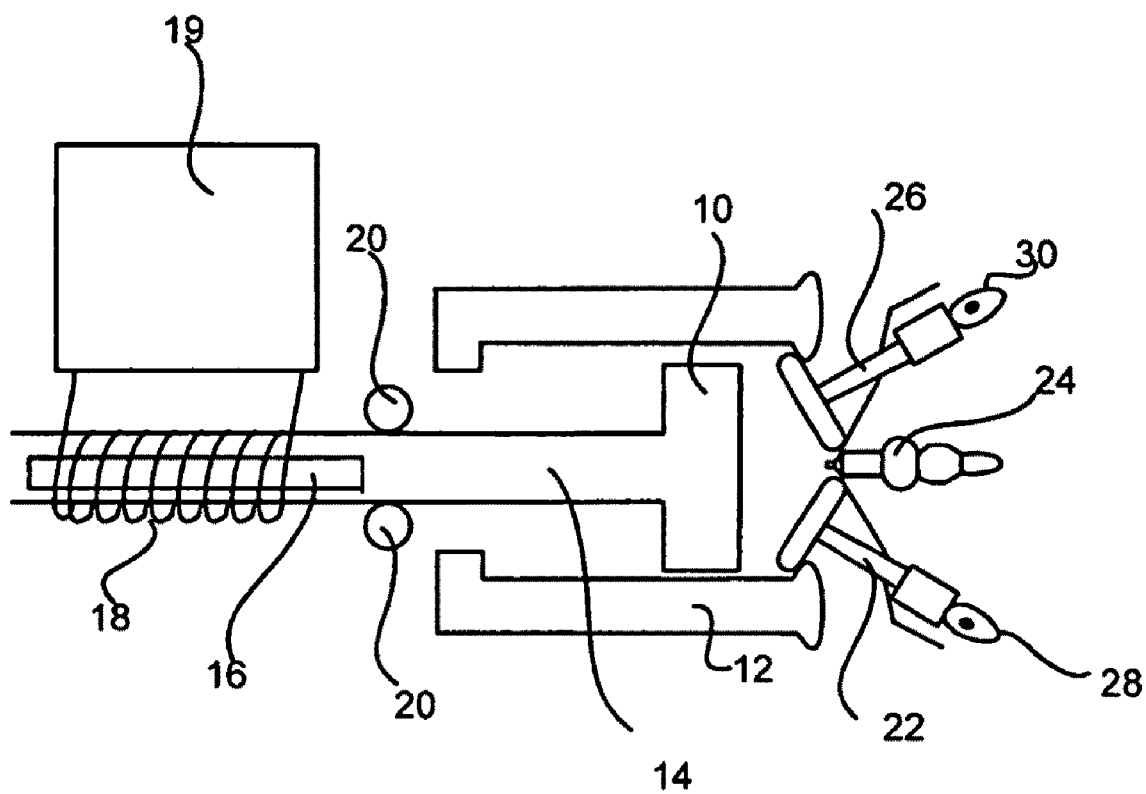
FIG. 1 is a schematic of a crankshaft-free piston-cylinder assembly.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

The term "valve," as used herein, includes any actuated flow controller or other actuated mechanism for selectively passing matter through an opening, including without limitation ball valves, plug valves, butterfly valves, choke valves, check valves, gate valves, leaf valves, piston valves, poppet valves, rotary valves, slide valves, solenoid valves, 2-way valves, or 3-way valves. Valves may be actuated by any method, including without limitation by mechanical, electrical, magnetic, camshaft-driven, hydraulic, or pneumatic means. "Valve timing" refers to any system of opening or closing valves in a specified temporal pattern relative to one another or to an engine component. For example, an intake valve may be configured to open before or during an intake stroke, and to close before a compression stroke.

The term "port," as used herein, includes any opening or set of openings (e.g., a porous foam) which may admit mass (solid, liquid, gas, or plasma) in one or more directions. Ports may be, but need not be, opened and closed via valves.

The term "bearing," as used herein, includes any part of a machine on which another part moves, slides, or rotates, including without limitation slide bearings, flexure bearings, ball bearings, roller bearings, gas bearings, or magnetic bearings.

The term "permanent magnet," as used herein, includes magnetizable materials that have been polarized to induce a persistent magnetic field. The term "permanent" should not be construed to require that a permanent magnet may not be demagnetized either intentionally or accidentally.

The term "armature," as used herein, includes any structure that interacts with a magnetic field via variable inductance or variable reluctance to do work (positive or negative) on the armature.

The term "reactant," as used herein, includes any material or combination of materials that can be induced to transform chemical potential energy to mechanical energy, for example to chemically react and drive a piston (typically by forming an expanding gas upon reaction). As used herein, a "fuel" is a particular type of reactant that reacts with an oxidizer to drive a piston. Fuels include, but are not limited to, hydrocarbon fuels such as gasoline, diesel, biodiesel, kerosene, propane, and butane, alcohol fuels such as ethanol, methanol, and butanol, and mixtures of any of the above. Other suitable reactants include decomposing reactants such as hydrazine (which may decompose to ammonia and nitrogen) or hydrogen peroxide (which may decompose to water and oxygen). The term "reaction products," as used herein, includes any material remaining after a reaction, including without limitation chemically reacted material, excess reactant which has not reacted or has only partially reacted, or any inert material which may be mixed with a reactant. A "substantially complete" reaction is one in which substantially all of at least one of the reactants has been consumed, or which has been substantially slowed or stopped by other factors such as changing temperature or pressure.

The term "carburetor," as used herein, includes a mechanism for mixing reactants (e.g., for mixing fuel and oxidizer) prior to their delivery to a cylinder.

The term "piston cycle," as used herein, includes any series of piston movements which begin and end with the piston in substantially the same configuration. In a four-stroke piston cycle, the cycle may include an intake stroke, a compression stroke, a power stroke, and an exhaust stroke. Additional or alternate strokes may form part of a piston cycle as described elsewhere herein. The term "operating frequency," as used herein, is the reciprocal of the time required to complete a single piston cycle. The term "frequency" should not be construed to limit piston operations to regular intervals.

The term "active material," as used herein, includes materials that may be induced to change their mechanical configuration by an applied environmental change, including without limitation piezoelectric, magnetostrictive, electrostrictive or shape-memory materials.

In general, terms used herein should be read to have their ordinary and common meanings as understood by one of ordinary skill in the art in view of the descriptions provided herein.

A variety of piston-cylinder assemblies are described herein for use in internal combustion engines, in which mechanical energy of a piston (e.g., kinetic energy of a piston) is converted to electrical energy. In some embodiments, these assemblies may be well-adapted to be installed in vehicles, for example in electric vehicles. In other embodiments, these assemblies may be appropriate for use in stationary or portable generators, which transform chemical energy into electrical energy (e.g., by burning a fuel).

FIG. 1 is a schematic of one embodiment of a piston-cylinder assembly. Piston 10 is disposed in cylinder 12, and has an elongated shaft 14 that extends out of the cylinder. The shaft 14 includes a permanent magnet 16, which is positioned to slide through converter coil 18. In the illustrated embodiment, bearings 20 act to maintain alignment of piston 10. (While roller bearings are illustrated in FIG. 1, any suitable type of bearing may be used.) Intake valve 22 allows a fuel-oxidizer mixture to enter chamber when the valve 22 is opened and piston 10 is moved away from the closed end of cylinder 12 (the "intake stroke"). In the illustrated embodiment, a simple valve structure is shown, but other embodiments may include fuel injectors or other devices for introducing a reactant into the cylinder. Motion of piston 10 away from the closed end of cylinder 12 may be driven by application of a voltage to converter coil 18, which induces an electromotive force on the magnet 16. The fuel-oxidizer mixture is compressed by motion of the piston 10, which may be driven by applying a voltage to converter coil 18, which induces an electromotive force on the magnet 16 to urge the piston 10 toward the closed end of cylinder 12 (the "compression stroke").

The compressed fuel-oxidizer is ignited by a spark from spark plug 24, thereby driving the piston 10 away from the closed end of the cylinder 12. As piston 10 moves away from the closed end of cylinder 12, magnet 16 moves through converter coil 18, inducing a voltage in the coil 18 (the "power stroke"). This voltage may be used to charge a battery, capacitor, or other energy management system as describe elsewhere herein. Once the power stroke is completed, piston 10 is moved toward the closed end of cylinder 12, for example by applying a voltage to converter coil 18, thereby inducing an electromotive force on magnet 16. As piston 10 moves toward the closed end of cylinder 12, reaction products from the reaction of the fuel and oxidizer are exhausted through exhaust valve 26 (the "exhaust stroke"). In the illustrated embodiment, valves 22 and 26 are operated by cams 28 and 30, respectively, but other valving systems may also be used as described elsewhere herein. If present, cams 28 and 30 may be driven by any convenient method, including by an electric activator such as a stepper motor or a torque motor.

In the illustrated embodiment, the intake stroke, compression stroke, and exhaust stroke are all driven by the converter. In other embodiments, one or more of these strokes may be driven by other means, for example, by a crankshaft and flywheel, a spring (e.g., a mechanical spring or a gas spring), an active material component, or a power stroke of an opposed cylinder. Driving a piston "during" a stroke includes driving it for only a portion of its total travel during the stroke.

In the illustrated embodiment, the operation of converter 18 is controlled by a controller 19, which may be analog, digital, or computer-based. Controller 19 determines the sign and magnitude of energy transfer through converter 18 based on external inputs and on the present and past states of one or more of the piston 10, cylinder 12, valves 22 and 26, and other engine components. These states may be inferred, for example, from measurement of the current through or voltage across the coils or active elements in the converter 18, or may be measured by one or more sensors (not shown), which may detect, among other possible parameters, the position, velocity, or acceleration of the piston 10, or the pressure, temperature, density, mass, or chemical makeup of any reactants in the cylinder 12. These sensors may use electromagnetic, electrochemical, optical, electromechanical, or other means of sensing the relevant parameter. For example, a fixed coil and piston-mounted magnet separate from the converter may be used to sense the position and velocity of the piston, a piezoelectric sensor may be used to sense the pressure in the cylinder, and a fiber-optically coupled spectrometer may detect light from inside the cylinder to sense the state of combustion of fuel and oxidizer. Any of these sensor outputs may feed directly or indirectly into controller 19. Controller 19 may also interface with an energy management system (not shown) as described elsewhere herein.

In the illustrated embodiment, a fuel-oxidizer mixture is ignited by firing a spark plug 24 mounted at the head of cylinder 12. In other embodiments, a different reactant or reaction trigger may be used. For example, instead of a spark plug, another type of electrical igniter, a thermal igniter (e.g., a glow plug), a chemical igniter (e.g., a squib), a photoigniter (e.g., a photochemical igniter, a photothermal igniter, a photoplasmic igniter, or a laser igniter), a catalyst, a hypergolic injection, a particle beam (e.g., an electron beam or an ion beam), or a plasma injection may trigger the chemical reaction. In other embodiments, the reaction trigger mechanism may be absent, and the reaction may be triggered by compression of the reactants as the piston 10 moves through the compression stroke. The reaction trigger may also be disposed in a different location, for example on a wall of cylinder 12 or on piston 10. In the case of a powered reaction trigger (e.g., a spark plug or a plasma injection), in some embodiments power for the reaction trigger may be provided by the energy management system that stores power from the power stroke.

In the illustrated embodiment, the introduced reactant is a fuel-oxidizer mixture. In other embodiments, other reactants, such as other suitable mixtures or decomposing reactants, may be used. In some embodiments, reactant(s) may be in condensed form (e.g., liquid or solid form). For example, the piston-cylinder assemblies described herein may be well-suited for use in an extraterrestrial vehicle (e.g., a moon buggy) or an underwater vehicle (e.g., a submarine or a torpedo), in which cases condensed reactants may be preferred (e.g., liquid fuel and liquid oxidizer). In some embodiments, liquid reactant(s) may be vaporized before reaction. When reactant(s) are in condensed form, the "compression stroke" may in some embodiments compress the reactant(s) by applying a compressive force without substantially changing reactant volume. In other embodiments, the "compression stroke" may simply reduce the volume of the reaction chamber, without substantially affecting the reactants within.

Figure 2:
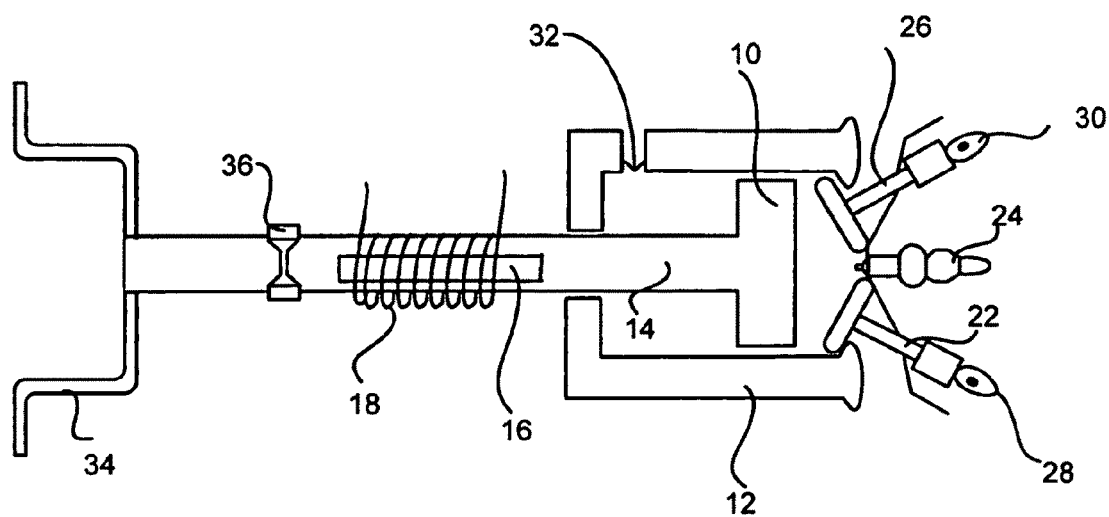
FIG. 2 is a schematic of a piston-cylinder assembly coupled to a crankshaft.

FIG. 2 is a schematic of another embodiment of a piston-cylinder assembly. As shown, piston 10 is slidably disposed in cylinder 12, and includes magnet 16 which is interoperable with converter coil 18 to induce a voltage in converter coil 18 during the power stroke (for example, during all or a portion of the power stroke). Rather than the bearings 20 shown in FIG. 1, cylinder 12 extends toward shaft 14 to provide a bearing surface. Optional port 32 prevents gas surrounding shaft 14 from being compressed and thereby retarding motion of piston 10 away from the closed end of cylinder 12. In other embodiments (not shown), port 32 may be omitted, and gas surrounding shaft 14 may act as a gas spring assisting the compression and exhaust strokes. In the illustrated embodiment, shaft 14 is coupled to crankshaft 34 via joint 36. Crankshaft 34 may, for example, act to control piston timing or valve timing, may act to provide some or all of the driving force for at least one of the intake, compression, or exhaust strokes, or may convert at least a portion of the energy of the power stroke to mechanical energy (e.g., to drive a gear).

Figure 3:
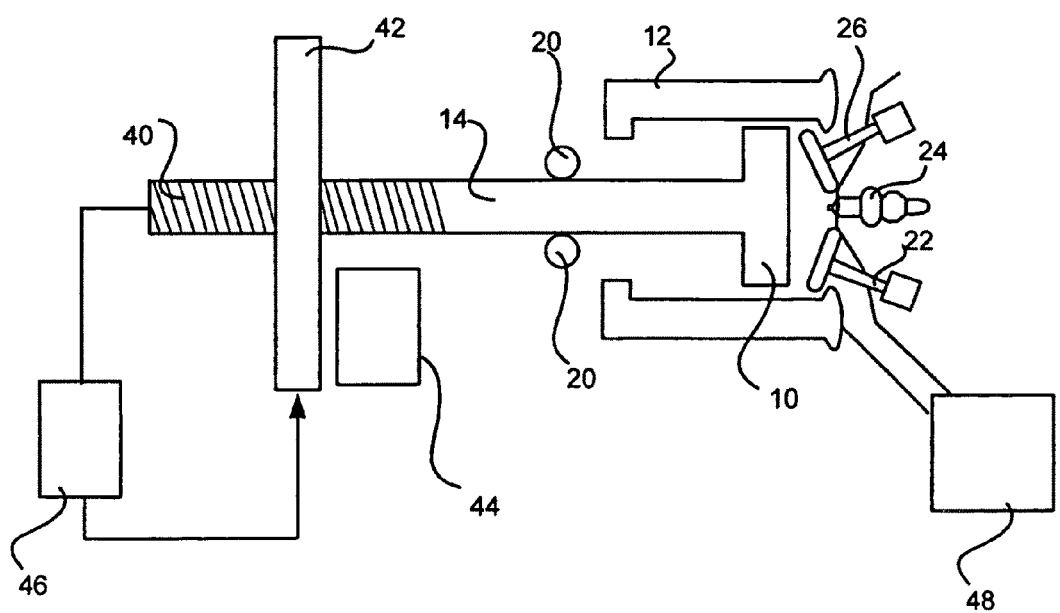
FIG. 3 is a schematic of a piston-cylinder assembly coupled to a homopolar generator.

FIG. 3 is a schematic of still another embodiment of a piston-cylinder assembly. In the illustrated embodiment, piston 10 lacks the magnet 16 as shown in FIG. 1 and FIG. 2. Shaft 14 includes a helical thread 40 which is coupled to a conductive helical gear 42. External magnet 44 (which may be a permanent magnet or an electromagnet) imposes a magnetic field upon gear 42. When gear 42 turns in response to movement of shaft 14 during the power stroke, a voltage is generated between shaft 14 and the outside of gear 42 (that is, the gear and the magnet form a homopolar generator). Converter 46 may use this voltage to charge a battery, capacitor, or other power management system as disclosed elsewhere herein. During the intake, compression, and exhaust strokes, converter 46 may apply a voltage between shaft 14 and the outside of gear 42, thereby inducing an electromotive force to turn gear 42 and drive piston 10. Helical threads 40 may be of constant pitch (in which case the angular velocity of gear 42 will be proportional to the linear velocity of piston 10), or may be of a variable pitch, so that the relation between angular velocity of gear 42 and linear velocity of piston 10 will depend on piston position. Those skilled in the art will recognize that other forms of linear-to-rotary conversion and other rotary electromagnetic converters may be substituted for the helical thread and homopolar converter illustrated in FIG. 3. For example, a cylinder of non-circular cross section with a helical profile may be used with a non-circular piston that rotates as it travels through the cylinder, or the piston may include tilted vanes or other structures that induce it to rotate, or the piston may be rotated by magnetic forces.

The illustrated embodiment also includes a carburetor 48 (shown schematically), which supplies a fuel-oxidizer mixture to intake valve 22. Rather than the cams illustrated in FIG. 1 and FIG. 2, intake and exhaust valves 22 and 26 are electronically controlled. In some embodiments, control of the valves may be integrated with the energy management system described elsewhere herein, and power may be supplied to the valves by the energy management system.

FIG. 1-FIG. 3 all show a spark plug 24 that ignites a fuel-oxidizer mixture (e.g., a fuel-air mixture). Other ignition sources may be substituted in any of the embodiments described herein, such as other electrical igniters, photoigniters, thermal igniters, chemical igniters, catalysts, hypergolic injections, particle beams, or plasma injections. In other embodiments, no ignition source may be required, and compression may be sufficient to initiate a reaction. In addition, the chemical reaction that drives the power stroke need not involve a fuel-oxidizer reaction, but may be any reaction that produces an expanding gas or other reaction product that will drive piston 10 in a power stroke (e.g., an energetic decomposition).

Figure 4:
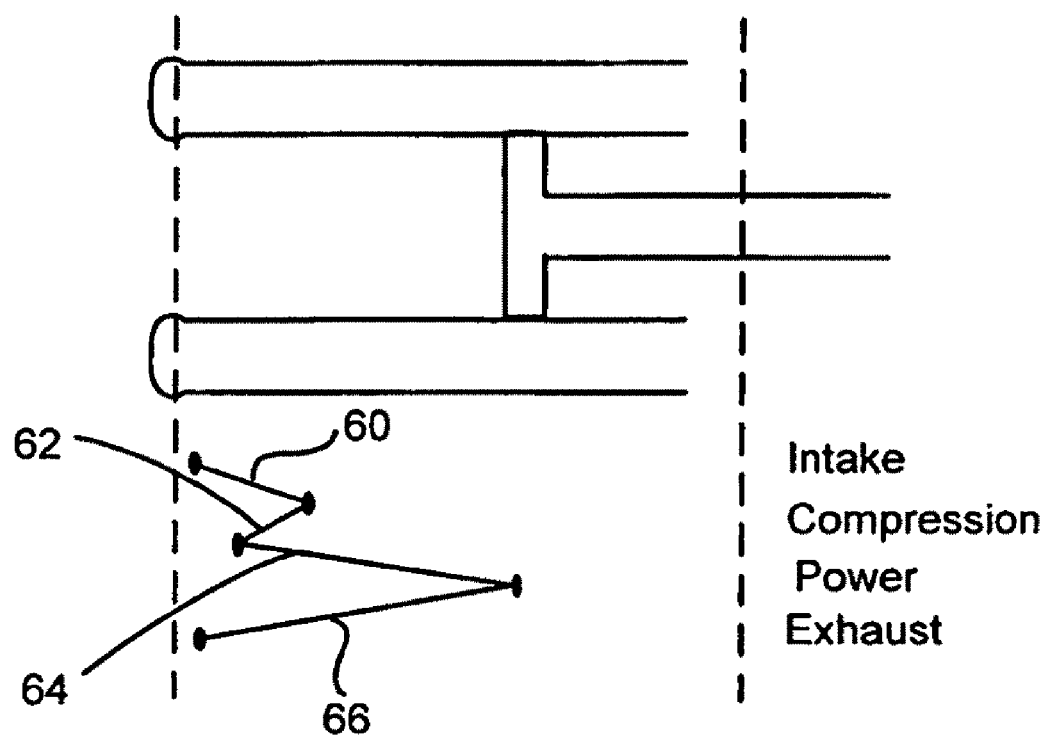
FIG. 4 illustrates the position of a piston in a cylinder during a four-stroke piston cycle.

FIG. 4 illustrates a four-stroke cycle for a piston engine. As shown, the piston travels away from the cylinder end for a relatively short distance during an intake stroke 60, in which at least one reactant is brought into the engine. In some embodiments, one or more reactants may be at or near ambient pressure, and may be drawn into the cylinder by a partial vacuum produced by the piston motion in the cylinder, while in other embodiments, the reactants may be injected or otherwise introduced into the piston, for example under pressure. Reactants may be supplied in any suitable form, including without limitation as a gas or as a liquid. The reactant(s) are then compressed by motion of the piston toward the cylinder end during compression stroke 62. A chemical reaction is triggered in the compressed reactant(s), which drives the piston away in power stroke 64. Finally, the piston returns to its original position in exhaust stroke 66, exhausting some or all of any reaction products from the cylinder.

In FIG. 4 and other Figures herein, piston motions are represented schematically as constant-velocity segments with abrupt velocity changes. Actual piston motions will in general involve more complex velocity profiles, exhibiting continuously-changing velocities and finite accelerations. An advantage of some of the electromagnetic power conversion systems described herein is that the coupling between the piston and the converter may be varied to optimize the velocity or acceleration at any point in the cycle, for example, to limit converter current, to control vibration, or to limit peak loads on the engine structure.

In the illustrated embodiment, power stroke 64 is substantially longer than intake stroke 60. A long power stroke may be more thermodynamically efficient for many engines, but has not typically been used in crankshaft engines, at least in part because it may require a larger crankshaft assembly, whose parasitic weight outstrips the increased efficiency of the long power stroke. Unequal strokes may be also achieved mechanically, for example by cam-and-roller or other mechanisms to couple piston motion to a shaft and flywheel, but such engines have typically been found to be heavy and complex as compared to crankshaft engines. In some embodiments, drawing power from the engine electromechanically may allow the engine to use a longer power stroke, or a power stroke having a different length from the intake stroke, without resort to cumbersome mechanical systems.

In embodiments where stroke length is not fixed by connection to other components such as a crankshaft, the engines shown herein may easily be operated at variable compression ratios. When intake stroke 60 and compression stroke 62 are electromagnetically driven, reaction may be commenced at any virtually any desired compression ratio or piston displacement by selection of appropriate stroke lengths. The compression ratio or piston displacement may be dynamically controlled for each piston cycle, for example based on factors such as current or predicted engine load, fuel type, fuel concentration, fuel-oxidizer ratio, pressure, or temperature. U.S. Pat. Nos. 4,104,995; 4,112,826; 4,182,288; 4,270,495; 4,517,931; 6,779,495; and 7,185,615, all of which are incorporated herein by reference, describe a variety of mechanical means for varying piston displacement or compression ratio. Similar effects may be achieved in a much simpler system by electromagnetically controlling piston position over time during each piston cycle.

In addition, piston motion during reaction may be minutely controlled to a degree not practical with most crankshaft engines. For example, in some embodiments, it may be desirable to hold piston 10 substantially stationary relative to cylinder 12 until reaction is substantially complete (isochoric reaction). Power stroke 64 may then be controlled in a configuration that optimizes power generation or that is otherwise desirable for a particular engine embodiment. For example, in some embodiments, power stroke 64 may be substantially isothermal or substantially adiabatic. Further, it is readily feasible either to fully exhaust cylinder 12 by driving piston 10 to its full extent in exhaust stroke 66, or to intentionally leave some reaction products in cylinder 12 by driving piston 10 through only a part of its range (e.g., to leave a portion of the exhaust in the cylinder when reactants are not fully reacted during power stroke 64, allowing a portion of the unreacted reactants a "second chance" before they are exhausted). The length and timing of each of the four strokes of the piston cycle may be varied dynamically and independently to optimize the engine performance under varying conditions of speed, load, reactant composition, temperature, etc.

Figure 5:
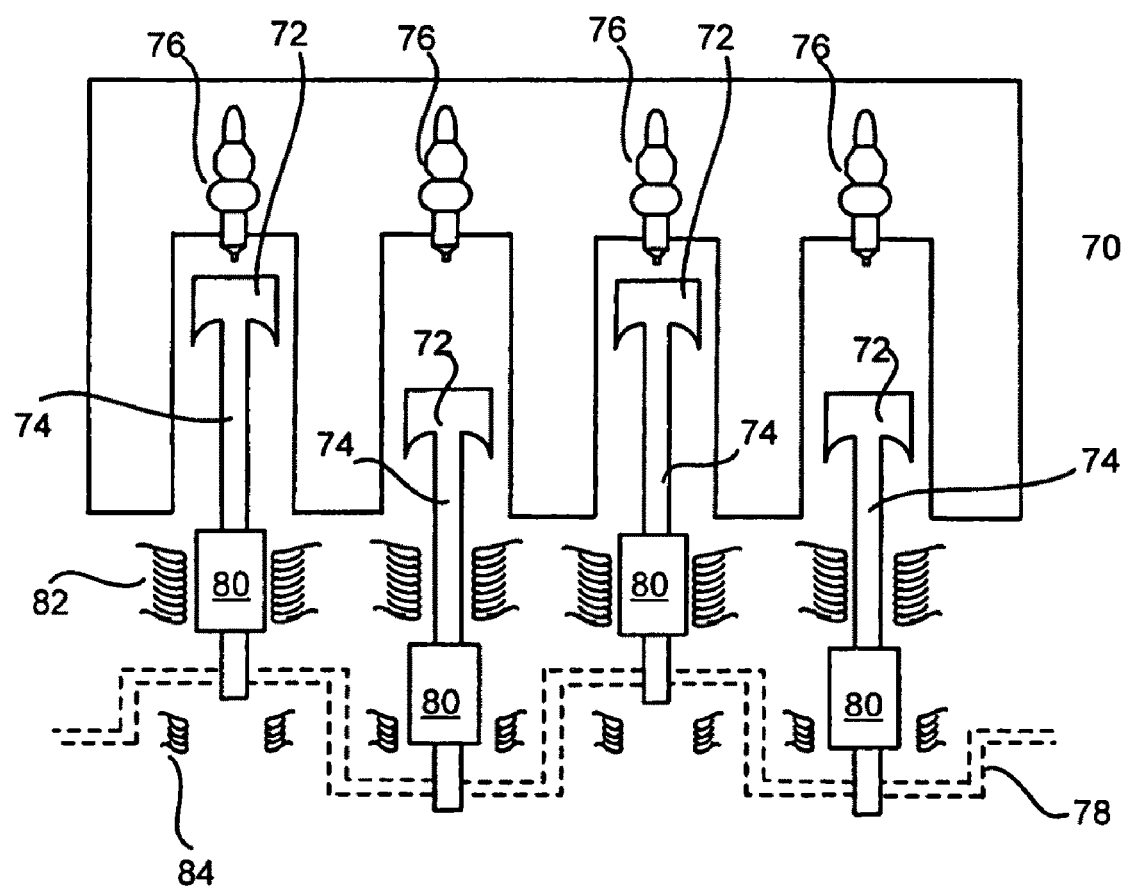
FIG. 5 is a schematic of a conventional engine retrofitted with an electromagnetic converter.

FIG. 5 is a schematic of a conventional engine which has been retrofitted for use with an electromagnetic converter. Before retrofitting, the engine includes a block 70, four piston heads 72, each having an associated rod or shaft 74 (the piston head 72 and shaft 74 together forming the piston), four spark plugs 76, and a crankshaft 78. (For simplicity of illustration, fuel intakes and exhausts are not shown in FIG. 5.) To retrofit, crankshaft 78 is removed, and each piston shaft 74 has a magnetic element 80 placed at the base of the shaft, near the former connection to crankshaft 78. In the illustrated embodiment, two pickup coils 82 and 84 for each piston shaft 74 have been placed above and at the former axis of crankshaft 78. For each piston, coils 82 and 84 act together as at least a component of a converter to apply a driving force to their associated pistons during intake, compression, and exhaust strokes, and to convert mechanical energy of their associated pistons to electrical energy during their power strokes, as described in connection with FIG. 4 and elsewhere herein. In some embodiments, the converters may be electrically coupled to a switching circuit that operates to switch coils 82 and 84 for operation during different portions of the engine cycle, while in other embodiments, each converter may have its own switching circuit. In either case, energy from each converter may either be stored in its own associated energy management system (described elsewhere herein), or may be pooled in a common energy management system. In some embodiments, a single coil may be provided for each piston shaft 74, instead of the two coils 82 and 84.

In some embodiments, crankshaft 78 may be retained, in which case a different arrangement of magnetic fields and converter coils or other variable inductance or variable reluctance circuits that convert mechanical energy of the pistons to and from electrical energy may be preferred, although the arrangement illustrated in FIG. 5 may still be used. If crankshaft 78 is retained, it serves to maintain synchronous operation of the pistons. If crankshaft 78 is removed, the pistons may be operated synchronously or asynchronously, and piston timing may be controlled by operation of the converter(s). In some embodiments, a hybrid system many be used, in which electromagnetic converters are installed on only a subset of pistons. In such embodiments, it may in some cases be preferable to retain crankshaft 78 to synchronize the pistons, while in other cases, other mechanical coupling systems may be preferable. The crankshaft 78, or a portion thereof, may be retained to drive auxiliary devices such as water pumps, oil pumps, fuel pumps, fans, or compressors, or such auxiliary devices may be powered from the converter, for example via an energy management system as described elsewhere herein.

Figure 6:
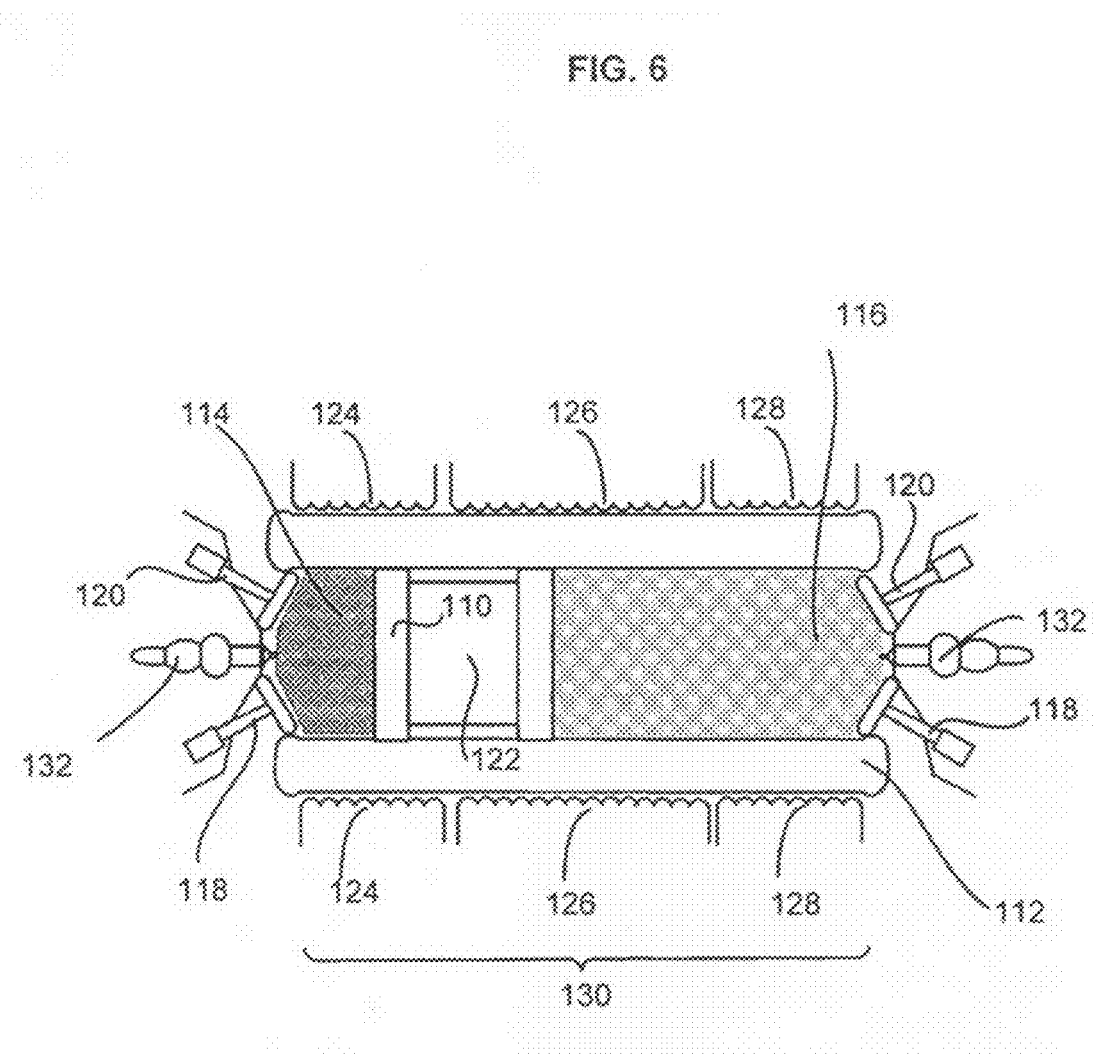
FIG. 6 is a schematic of a dual-ended free piston-cylinder assembly.

FIG. 6 is a schematic of a free-piston engine. Piston 110 is slidably disposed in cylinder 112, which has two end chambers 114 and 116. In the illustrated embodiment, each end includes an intake valve 118 and an exhaust valve 120, which are configured to admit reactants and to expel reaction product, respectively. Piston 110 includes a magnetic element 122, which may be an electromagnet, a permanent magnet, or a magnetically susceptible material such as an iron core. Piston 110 can be driven in either direction by application of a voltage to converter coils 124, 126, and 128, which together form a converter 130. In addition, the converter 130 is configured to convert mechanical energy of piston 110 to electrical energy. This energy may be stored, for example, in a battery, capacitor, or other energy management system (not shown). The illustrated embodiment includes spark plugs 132, but other ignition sources may be used such as those described elsewhere herein, or the engine may be operated without an ignition source using reactants that spontaneously react in end chambers 114 and 116.

Figure 7:
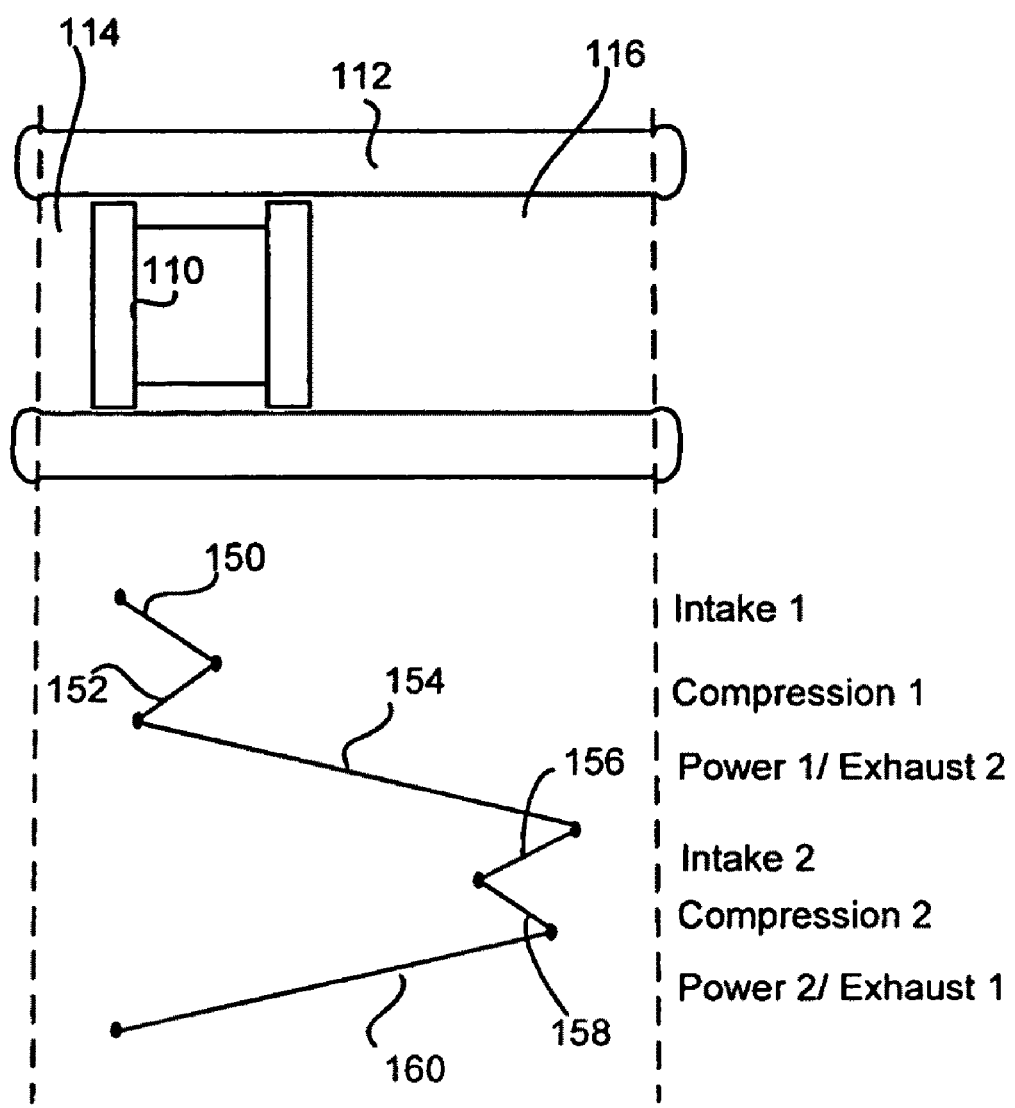
FIG. 7 illustrates the position of a piston in a double-ended cylinder during a six-stroke piston cycle.

FIG. 7 illustrates a method of operating a free-piston engine such as the one shown in FIG. 6 using a six-stroke cycle. Converter 130 operates to drive piston 110 away from end chamber 114, drawing reactants (e.g., a fuel-oxidizer mixture) into chamber 114, as an intake stroke 150 for chamber 114. Converter 130 then operates to drive piston 110 toward end chamber 114 as a compression stroke 152, compressing the reactants in chamber 114. A reaction between the reactants is then initiated (e.g., by a spark plug), driving the piston away from chamber 114. During this power stroke 154, the piston travels to the other end of cylinder 112, exhausting any reaction products in end chamber 116. Converter 130 draws power from the piston during power stroke 154, which may be stored in an energy management system as described elsewhere herein. Converter 130 then drives piston 110 away from end chamber 116, drawing reactants into chamber 116 as an intake stroke 156. (In some embodiments, the reactants so drawn into chamber 116 may differ from those drawn into chamber 114 during intake stroke 150 in composition, proportions, temperature, or other properties, while in other embodiments, they may be substantially similar) Converter 130 then operates to drive piston 110 toward end chamber 116 as a compression stroke 158, compressing the reactants in chamber 116. A reaction between the reactants is then initiated, driving the piston away from chamber 116 as power stroke 160. Converter 130 converts mechanical energy of piston 110 to electrical energy during power stroke 160. In addition, any reaction products remaining in end chamber 114 are exhausted by power stroke 160. The six-stroke cycle may then be repeated.

It will be seen that the six-stroke cycle shown in FIG. 7 can be represented as two overlapping four-stroke cycles, where the power stroke on one side of the cylinder overlaps with the exhaust stroke on the other side of the cylinder. As discussed above in connection with FIG. 4, it may be thermodynamically favorable for an engine to use a relatively long power stroke. In the embodiment illustrated in FIG. 7, the power strokes are substantially longer than the intake or compression strokes, allowing the engine to take advantage of a long cylinder during the power stroke without requiring a long piston travel during the strokes driven by the converter 130. In other embodiments, all strokes may be of similar length.

Figure 8:
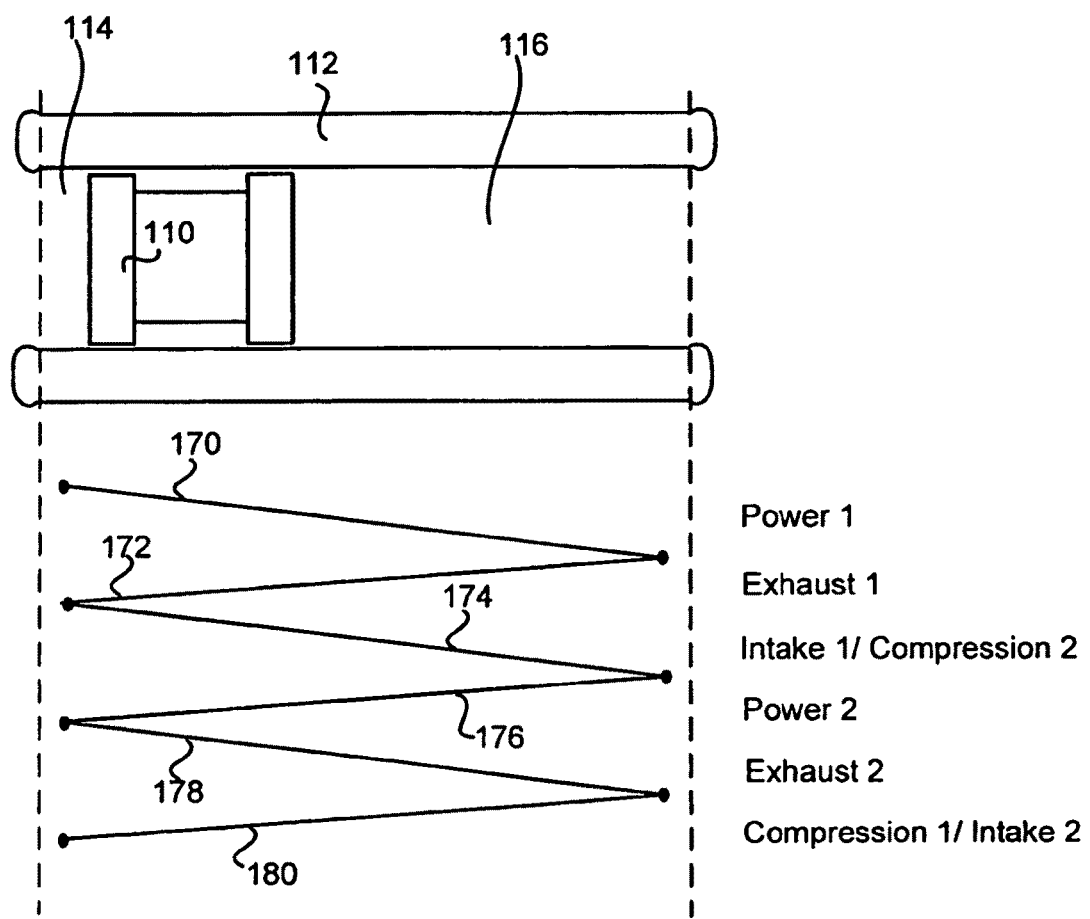
FIG. 8 illustrates the position of a piston in a double-ended cylinder during an alternate six-stroke piston cycle.

FIG. 8 shows an alternative engine cycle for a free-piston engine such as that illustrated in FIG. 6. As shown, reactants in chamber 114 are reacted to drive power stroke 170 as piston 110 moves away from chamber 114, and converter 130 converts mechanical energy of power stroke 170 to electrical energy, which may be stored in an energy management system. Converter 130 then drives the piston toward chamber 114 in exhaust stroke 172, exhausting reaction products from chamber 114. Converter 130 drives the piston away from chamber 114 in intake/compression stroke 174, which draws reactants into chamber 114 and compresses reactants already in chamber 116. The reactants in chamber 116 are reacted to drive power stroke 176 as piston 110 moves away from chamber 116 (compressing the reactants in chamber 114 without reaction), and converter 130 converts mechanical energy of the power stroke 176 to electrical energy, which may be stored in an energy management system.

Converter 130 then drives piston 110 toward chamber 116 in exhaust stroke 178, exhausting reaction products from chamber 116 (and decompressing the reactants that were incidentally compressed during power stroke 176). Finally, converter 130 drives piston 110 toward chamber 114 in compression/intake stroke 180, compressing the reactants in chamber 114 and drawing reactants into chamber 116. The cycle may then be repeated. Those of ordinary skill in the art will recognize that the six-stroke cycle shown in FIG. 8 can be represented as two overlapping four-stroke cycles, where the intake stroke on one side of the cylinder overlaps with the compression stroke on the other side of the cylinder.

Figure 9:
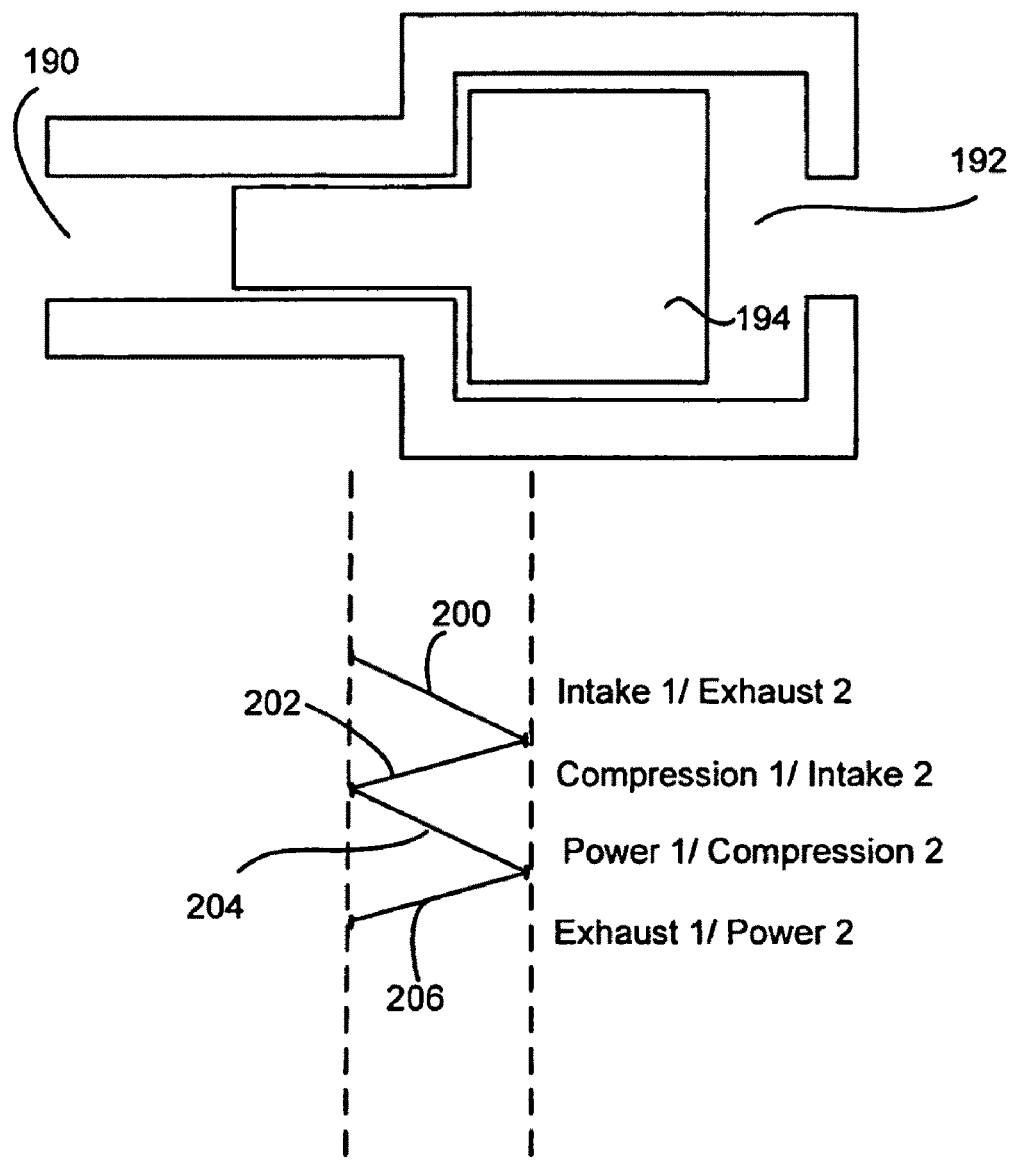
FIG. 9 illustrates the position of an asymmetrical piston in a double-ended cylinder during a four-stroke piston cycle.

FIG. 9 illustrates yet another engine cycle for a free-piston engine. The illustrated engine is physically asymmetric, with chamber 190 having a narrower diameter than chamber 192, and piston 194 having a corresponding step in diameter. Either of the cycles described in connection with FIG. 7 and FIG. 8 may also be used with a physically asymmetric engine such as the one shown in FIG. 9, or the cycle illustrated in FIG. 9 may be used with a physically symmetric engine such as the one illustrated in FIG. 6. As shown, converter 130 drives piston 194 toward chamber 192, drawing reactants into chamber 190 and exhausting reaction products from chamber 192 in intake/exhaust stroke 200. Converter 130 then drives piston 194 toward chamber 190, compressing reactants in chamber 190 and drawing reactants into chamber 192 in compression/intake stroke 202. The compressed reactants in chamber 190 are then reacted, driving piston 194 away from chamber 190 and compressing the reactants in chamber 192 in power/compression stroke 204. Finally, the compressed reactants in chamber 192 are reacted, driving piston 194 away from chamber 192 and exhausting reaction products from chamber 190 in exhaust/power stroke 206. During strokes 204 and 206, converter 130 converts mechanical energy of piston 194 to electrical energy. This asymmetric four-stroke cycle can be represented as two offset overlapping four-stroke cycles for the two separate chambers 190 and 192.

Figure 10:
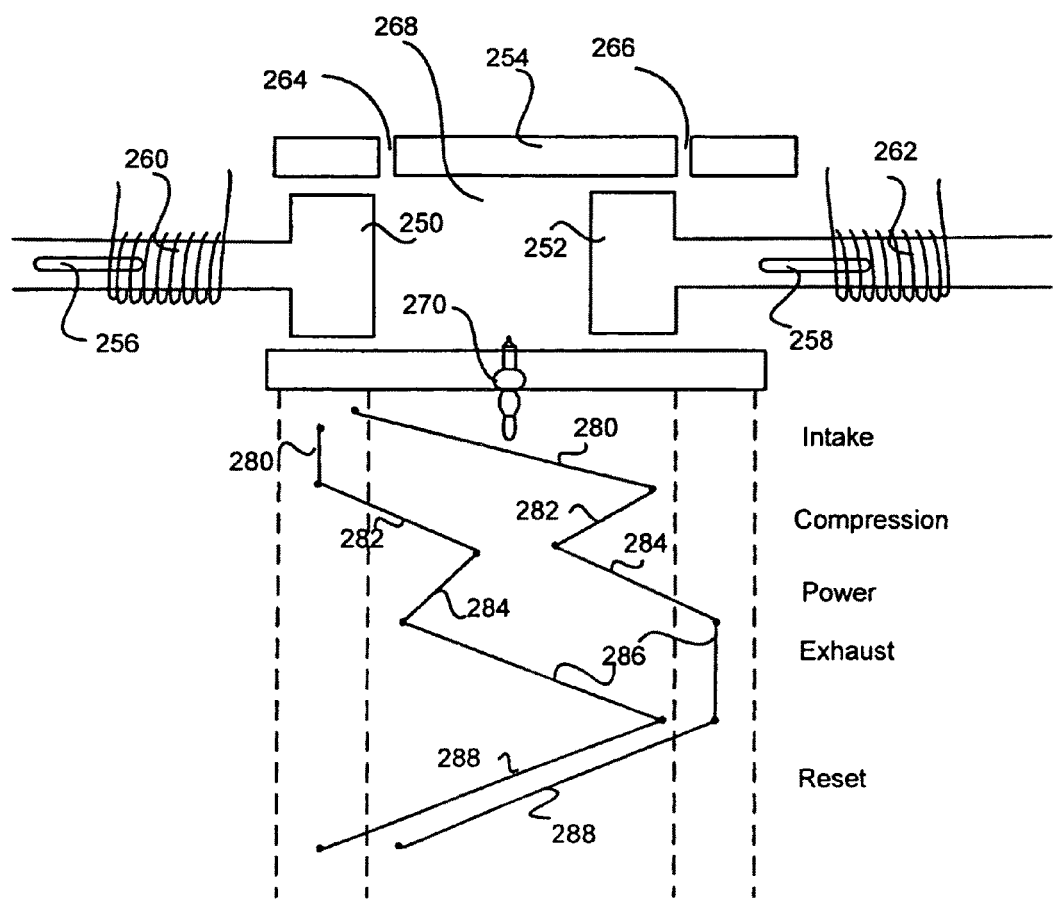
FIG. 10 illustrates the positions of two opposing pistons in a common cylinder in a four-stroke piston cycle.

FIG. 10 illustrates an opposed-piston engine and a corresponding engine cycle. In the depicted engine, two opposed pistons 250 and 252 are slidably disposed in cylinder 254. The pistons include magnet elements 256 and 258, which are operably linked to corresponding converter coils 260 and 262, respectively. Converter coils 260 and 262 may be electrically coupled to form a common converter, or they may be operated separately as segments of two independent converters. In the embodiment shown, coils 260 and 262 both form parts of a common converter (not shown). Cylinder 254 includes intake port 264 and exhaust port 266. In the illustrated embodiment, these ports 264 and 266 are simple openings, which may be closed when they are occluded by the movement of pistons 250 and 252 respectively. In other embodiments, ports 264 and 266 may include valves.

In use, converter coil 260 first holds piston 250 in a substantially fixed position with intake port 264 open, while converter coil 262 is driven to draw piston 252 away from piston 250, while maintaining occlusion of exhaust port 266, thereby drawing reactants through intake port 264 into chamber 268 in cylinder 254, in intake stroke 280. Converter coils 260 and 262 are then driven to move pistons 250 and 252 together, occluding both ports 264 and 266 and compressing reactants in chamber 268, in compression stroke 282. Reaction trigger 270 (in the illustrated embodiment, a spark plug) triggers a reaction in the compressed reactants, driving pistons 250 and 252 away from one another in power stroke 284. Converter coils 260 and 262 convert mechanical energy of pistons 250 and 252, respectively, into electrical energy, and also control the positions of pistons 250 and 252 so that piston 250 continues to occlude intake port 264 while piston 252 moves to open exhaust port 266. Piston 252 is then held substantially still by converter coil 262 while piston 250 is moved toward piston 252 by converter coil 260, thereby exhausting reaction products from chamber 268 through exhaust port 266 in exhaust stroke 286. Finally, both pistons 250 and 252 are moved together to occlude exhaust port 266 and to open intake port 264 in reset stroke 288. The cycle may then be repeated.

FIG. 11 is a schematic of another opposed-piston engine and an alternative engine cycle. In the illustrated embodiment, two opposed pistons 300 and 302 are slidably disposed in cylinder 304. Piston 300 includes a magnet element 306, which is operably linked to converter coil 308. Piston 302 is mechanically coupled to a crankshaft 310 via joint 312. Cylinder includes two ports 314 and 316, which are coupled to valves 318 and 320, respectively. Valves 318 and 320 each have two positions, allowing ports 314 and 316 to function either as intake ports when their corresponding valves 318 and 320 connect them to a reactant source 322, or as exhaust ports when their corresponding valves 318 and 320 connect them to an exhaust path 324. A reaction chamber 326 is defined between piston 300 and piston 302.

In the illustrated engine cycle, valves 318 and 320 are first set so that port 314 is connected to a reactant source 322 and port 316 is connected to exhaust path 324. The first four strokes of the engine correspond to strokes 280, 282, 284, and 286 as shown in FIG. 10, while the next four strokes correspond to a mirror image of strokes 280, 282, 284, and 286. In intake stroke 350, piston 300 is held substantially in place by converter coil 308 in a position that leaves port 314 open, while crankshaft 310 draws piston 302 away from piston 300, drawing reactants through port 314 into chamber 326 while continuing to occlude port 316. Pistons 300 and 302 are then moved together by converter coil 308 and crankshaft 310, respectively, compressing the reactants and occluding ports 314 and 316 in compression stroke 352. A reaction is initiated between the reactants, for example by discharging spark plug 328. The reaction drives pistons 300 and 302 apart, transferring mechanical energy from piston 302 to crankshaft 310 and allowing converter coil 308 to convert mechanical energy of piston 300 to electrical energy in power stroke 354. Piston 300 is not allowed to open port 314, while piston 302 moves far enough to open port 316. Converter coil 308 then drives piston 300 toward piston 302 in exhaust stroke 356, allowing reaction products to exhaust through port 316, while piston 302 remains in a substantially fixed position.

After exhaust stroke 356, valves 318 and 320 are reset so that port 314 is connected to exhaust path 324 and port 316 is connected to reactant source 322. While piston 302 remains in a position holding port 316 open, piston 300 is drawn back by converter coil 308 to draw reactants into chamber 326 through port 316 in intake stroke 358. Both pistons 300 and 302 then are moved toward one another by converter coil 308 and crankshaft 310, respectively, occluding both ports 314 and 316 and compressing reactants in chamber 326 for compression stroke 360. A chemical reaction between the reactants is triggered, moving pistons 300 and 302 apart, transferring mechanical energy from piston 302 to crankshaft 310 and allowing converter coil 308 to convert mechanical energy of piston 300 to electrical energy in power stroke 362. Piston 302 is not allowed to open port 316, while piston 300 moves far enough to open port 314. Crankshaft 310 then drives piston 302 toward piston 300 in exhaust stroke 364, allowing reaction products to exhaust through port 314, while piston 300 remains in a substantially fixed position. After exhaust stroke 364, valves 318 and 320 are reset so that port 314 is connected to reactant source 322 and port 316 is connected to exhaust path 324, and the cycle may be repeated.

In some of the embodiments described herein which include crankshafts, an attached piston may move in a more complicated pattern than a regular fixed-length stroke. Such movement may generally be achieved by means such as eccentric crankshafts, crankshafts which reverse direction or change speed, or active connections between piston and crankshaft which change their relative positions (e.g., by use of active material elements). Alternatively, crankshafts may be replaced by alternative mechanical coupling devices such as cam-and-track or swashplate mechanisms, some of which can produce arbitrarily complex patterns of motion at one or more pistons.

Embodiments depicted in the Figures include magnets that move through substantially stationary coils, magnets that move outside substantially stationary coils, and conductors that move through a substantially stationary magnetic field. It will be understood that each of these configurations may be used in conjunction with other piston-cylinder arrangements, such as those depicted in the Figures or described in the text. In addition, those of ordinary skill in the art will recognize that other arrangements of conductors, magnetic materials, and magnetic fields may be used to convert mechanical energy to or from electrical energy in an engine. For example, Type I superconducting materials expel magnetic fields (the Meissner effect), so that a moving Type I superconductor can change the flux in a magnetic circuit, inducing currents in a converter coil. Type II superconducting materials trap magnetic fields, and may thus be used in place of permanent magnets or electromagnets in a converter, while providing additional unique characteristics, e.g., functioning as passively-stable magnetic bearings. In general, energy may be transferred to and from the piston by any variable reluctance or variable inductance magnetic circuit.

In some embodiments, engines include permanent magnets or electromagnets. In either case, the engine may include thermal shielding, insulation, or other thermal control apparatus (e.g., a cooling system) that functions to maintain temperatures of selected engine components within a desired range. In particular, a thermal control system may act to maintain a magnetic material below its Curie temperature.

The Figures depict several different configurations of single or dual pistons in cylinders. In some embodiments, an engine may include a plurality of cylinders, which may be of the same or of different types. Pistons in different cylinders may operate independently, or may be operatively coupled (e.g., mechanically coupled as by connection to a common crankshaft). In particular, an engine may include control electronics that select whether to operate a piston, and which piston to operate, in response to a determined actual or predicted operating condition (e.g., incline of the engine or of a vehicle powered by the engine, temperature, current draw, speed, acceleration, braking, load such as gross vehicle weight, fuel composition, engine emissions, power, local rules such as emissions limits, or engine settings). For example, when power draw is relatively heavy, the control electronics may run pistons more frequently or run more cylinders. When power draw is relatively light, the control electronics may run fewer pistons, including not running a piston at all.

In embodiments in which the pistons are not coupled to one another in a configuration that maintains their relative phase (e.g., via connection to a common crankshaft), they may be operated synchronously or asynchronously. As used herein in connection with piston timing, the term "asynchronous" means that the cylinders are operated with at least one stroke having a different duration or velocity profile from cylinder to cylinder, so that a constant phase relationship is not maintained between substantially simultaneous piston cycles. Examples of asynchronous piston operation include operating two pistons at different cycle frequencies or operating one piston while leaving another substantially stationary.

In each of the illustrated embodiments, a converter (which may include coils or another variable reluctance or variable inductance circuit) is connected to an energy management system. The energy management system operates as an energy source and sink, drawing power from the piston during the power stroke and returning power to the piston during other strokes. Power conversion systems that can accept power inputs of variable length or amplitude and convert them to supply a substantially constant voltage are described, for example in U.S. Pat. No. 4,399,499, which is incorporated herein by reference. Such conversion systems may be used to condition power intake from the engine to make it more useful for other purposes, such as for driving a vehicle. The energy management system may also accept power inputs from other sources, for example from regenerative braking systems. The energy management system may store power in an energy storage device such as a battery or a capacitor (including a supercapacitor, ultracapacitor, or hypercapacitor). U.S. Pat. No. 6,590,360, which is incorporated herein by reference, describes a switching circuit designed to transfer energy in both directions between a battery and a motor/generator that may be used for this purpose. In some embodiments, the energy management system may also power auxiliary devices such as water pumps, oil pumps, fuel pumps, fans, or compressors.

It will be understood by those within the art that, in general, terms used herein, and especially in the appended claims are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of introductory phrases such as "at least one" or "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a cylinder" should typically be interpreted to mean "at least one cylinder"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two cylinders," or "a plurality of cylinders," without other modifiers, typically means at least two cylinders). Furthermore, in those instances where a phrase such as "at least one of A, B, and C," "at least one of A, B, or C," or "an [item] selected from the group consisting of A, B, and C," is used, in general such a construction is intended in the sense one having skill in the art would understand the convention (e.g., any of these phrases would include but not be limited to systems that have A alone, B alone, C alone, A and B together, A and C together, B and C together, and/or A, B, and C together). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method of operating an internal combustion engine including
   at least a first piston slidably disposed in a first cylinder having a first and a second closed end; and
   a first converter operable with the first piston, the first converter being configured to convert mechanical energy into electrical energy, the first converter being further configured to convert electrical energy into mechanical energy,
   the method comprising:
   a) introducing a first quantity of reactant into the first closed end of the first cylinder;
   b) applying electrical energy to the first converter to slide the first piston in the first cylinder toward the first closed end;
   c) reacting the introduced first quantity of reactant while holding the first piston substantially still during the reaction, thereby inducing movement of the first piston toward the second closed end;
   d) converting mechanical energy of the first piston to electrical energy via the converter as the first piston moves toward the second closed end;
   e) introducing a second quantity of reactant into the second closed end of the first cylinder;
   f) applying electrical energy to the first converter to slide the first piston in the first cylinder toward the second closed end;
   g) reacting the introduced second quantity of reactant, thereby inducing movement of the first piston toward the first closed end; and
   h) converting mechanical energy of the first piston to electrical energy via the first converter as the first piston moves toward the first closed end.

2. The method of claim 1, wherein inducing movement of the first piston toward the second closed end includes exhausting reaction products from the second closed end.

3. The method of claim 1, wherein inducing movement of the first piston toward the first closed end includes exhausting reaction products from the first closed end.

4. The method of claim 1, further comprising
   applying electrical energy to the converter to move the first piston toward the second closed end before step b); or
   applying electrical energy to the converter to move the first piston toward the first closed end after step d) and before step f).

5. The method of claim 1, wherein the first piston travels a greater distance during step c) than during step b).

6. The method of claim 1, wherein the first piston travels a greater distance during step g) than during step f).

7. The method of claim 1, further comprising determining an operating frequency for the first cylinder based at least in part on an actual or predicted operating condition.

8. The method of claim 1, wherein holding the first piston substantially still includes applying a force to the first piston via the first converter.

9. The method of claim 1, further comprising releasing the first piston when the reaction is substantially complete.

10. The method of claim 1, wherein the first quantity of reactant and the second quantity of reactant differ in composition.

11. The method of claim 1, further comprising exhausting a first quantity of reaction product from the first closed end of the first cylinder.

12. The method of claim 1, wherein the first converter is connected to an energy management system.

13. The method of claim 12, wherein converting mechanical energy of the first piston to electrical energy via the converter as the first piston moves toward the first closed end includes transferring electrical energy to the energy management system.

14. The method of claim 12, wherein applying electrical energy to the first converter to slide the first piston in the first cylinder toward the first closed end includes drawing electrical energy from the energy management system.

15. A method of operating an internal combustion engine including
    at least a first piston slidably disposed in a first cylinder having a first and a second closed end; and
    a first converter operable with the first piston, the first converter being configured to convert mechanical energy into electrical energy, the first converter being further configured to convert electrical energy into mechanical energy,
    the method comprising:
    a) introducing a first quantity of reactant into the first closed end of the first cylinder;
    b) applying electrical energy to the first converter to slide the first piston in the first cylinder toward the first closed end;
    c) reacting the introduced first quantity of reactant, thereby inducing movement of the first piston toward the second closed end, wherein the first piston travels a greater distance during step c) than during step b);
    d) converting mechanical energy of the first piston to electrical energy via the converter as the first piston moves toward the second closed end;
    e) introducing a second quantity of reactant into the second closed end of the first cylinder;
    f) applying electrical energy to the first converter to slide the first piston in the first cylinder toward the second closed end;

g) reacting the introduced second quantity of reactant, thereby inducing movement of the first piston toward the first closed end; and h) converting mechanical energy of the first piston to electrical energy via the first converter as the first piston moves toward the first closed end.

16. A method of operating an internal combustion engine including
- at least a first piston slidably disposed in a first cylinder having a first and a second closed end; and
- a first converter operable with the first piston, the first converter being configured to convert mechanical energy into electrical energy, the first converter being further configured to convert electrical energy into mechanical energy, the method comprising:

a) introducing a first quantity of reactant into the first closed end of the first cylinder;

b) applying electrical energy to the first converter to slide the first piston in the first cylinder toward the first closed end;

c) reacting the introduced first quantity of reactant, thereby inducing movement of the first piston toward the second closed end;

d) converting mechanical energy of the first piston to electrical energy via the converter as the first piston moves toward the second closed end;

e) introducing a second quantity of reactant into the second closed end of the first cylinder;

f) applying electrical energy to the first converter to slide the first piston in the first cylinder toward the second closed end;

g) reacting the introduced second quantity of reactant, thereby inducing movement of the first piston toward the first closed end, wherein the first piston travels a greater distance during step g) than during step f); and h) converting mechanical energy of the first piston to electrical energy via the first converter as the first piston moves toward the first closed end.

17. A method of operating an internal combustion engine including
- at least a first piston slidably disposed in a first cylinder having a first and a second closed end; and
- a first converter operable with the first piston, the first converter being configured to convert mechanical energy into electrical energy, the first converter being further configured to convert electrical energy into mechanical energy, the method comprising:

a) introducing a first quantity of reactant into the first closed end of the first cylinder;

b) applying electrical energy to the first converter to slide the first piston in the first cylinder toward the first closed end;

c) reacting the introduced first quantity of reactant, thereby inducing movement of the first piston toward the second closed end;

d) converting mechanical energy of the first piston to electrical energy via the converter as the first piston moves toward the second closed end;

e) introducing a second quantity of reactant into the second closed end of the first cylinder, the first quantity of reactant and the second quantity of reactant differing in composition;

f) applying electrical energy to the first converter to slide the first piston in the first cylinder toward the second closed end;

g) reacting the introduced second quantity of reactant, thereby inducing movement of the first piston toward the first closed end; and h) converting mechanical energy of the first piston to electrical energy via the first converter as the first piston moves toward the first closed end.

* * * * *